United States Patent
Chujoh et al.

(10) Patent No.: US 12,445,597 B2
(45) Date of Patent: Oct. 14, 2025

(54) VIDEO DECODING APPARATUS

(71) Applicant: SHARP KABUSHIKI KAISHA, Sakai (JP)

(72) Inventors: Takeshi Chujoh, Sakai (JP); Tomohiro Ikai, Sakai (JP); Tomoko Aono, Sakai (JP); Eiichi Sasaki, Sakai (JP); Yukinobu Yasugi, Sakai (JP); Tomonori Hashimoto, Sakai (JP); Tianyang Zhou, Sakai (JP)

(73) Assignee: SHARP KABUSHIKI KAISHA, Sakai (JP)

( * ) Notice: Subject to any disclaimer, the term of this patent is extended or adjusted under 35 U.S.C. 154(b) by 0 days.

(21) Appl. No.: 18/072,182

(22) Filed: Nov. 30, 2022

(65) Prior Publication Data
US 2023/0085680 A1     Mar. 23, 2023

Related U.S. Application Data

(63) Continuation of application No. 17/122,919, filed on Dec. 15, 2020, now Pat. No. 11,563,934.

(30) Foreign Application Priority Data
Dec. 17, 2019 (JP) ................. 2019-227057

(51) Int. Cl.
*H04N 19/563* (2014.01)
*H04N 19/105* (2014.01)
(Continued)

(52) U.S. Cl.
CPC ........ *H04N 19/105* (2014.11); *H04N 19/172* (2014.11); *H04N 19/174* (2014.11);
(Continued)

(58) Field of Classification Search
CPC .. H04N 19/105; H04N 19/172; H04N 19/174; H04N 19/176; H04N 19/513;
(Continued)

(56) References Cited

U.S. PATENT DOCUMENTS 9,912,966 B2 * 3/2018 Hannuksela ........... H04N 19/44
10,070,125 B2 * 9/2018 Hannuksela ........... H04N 19/42
(Continued)

FOREIGN PATENT DOCUMENTS

WO    2021/112633 A1    6/2021

OTHER PUBLICATIONS

Benjamin Bross, Versatile Video Coding (Draft 7), JVET-P2001-vE (Year: 2019).*
(Continued)

*Primary Examiner* — Philip P. Dang
(74) *Attorney, Agent, or Firm* — ScienBiziP, P.C.

(57) ABSTRACT

An adaptive motion vector prediction unit configured to adaptively perform spatial prediction that performs prediction using a motion vector around a target block and temporal prediction that performs prediction using a motion vector of a collocated picture is included, and in the temporal prediction performed by the adaptive motion vector prediction unit, the collocated picture to be referred to is designated on a per picture basis, and a reference list is designated on a per slice basis.

1 Claim, 31 Drawing Sheets

(51) Int. Cl.

| | |
|---|---|
| *H04N 19/172* | (2014.01) |
| *H04N 19/174* | (2014.01) |
| *H04N 19/176* | (2014.01) |
| *H04N 19/513* | (2014.01) |
| *H04N 19/54* | (2014.01) |
| *H04N 19/593* | (2014.01) |
| *H04N 19/70* | (2014.01) |

(52) U.S. Cl.
CPC ......... *H04N 19/176* (2014.11); *H04N 19/513* (2014.11); *H04N 19/593* (2014.11); *H04N 19/70* (2014.11)

(58) Field of Classification Search
CPC .... H04N 19/593; H04N 19/70; H04N 19/573; H04N 19/52
See application file for complete search history.

(56) References Cited

U.S. PATENT DOCUMENTS

| | | | | |
|---|---|---|---|---|
| 10,148,961 B2* | 12/2018 | Zhang | .................. | H04N 19/174 |
| 10,178,384 B2* | 1/2019 | Ikai | ...................... | H04N 19/176 |
| 10,230,965 B2* | 3/2019 | Hannuksela | ........... | H04N 19/70 |
| 10,334,248 B2* | 6/2019 | Zhang | .................. | H04N 19/122 |
| 10,666,936 B2* | 5/2020 | Lee | ........................ | H04N 19/56 |
| 10,742,972 B1* | 8/2020 | Li | ........................ | H04N 19/109 |
| 10,834,419 B2* | 11/2020 | Joshi | ...................... | H04N 19/52 |
| 11,039,143 B2* | 6/2021 | Zhang | .................. | H04N 19/17 |
| 11,184,636 B2* | 11/2021 | Aono | .................... | H04N 19/563 |
| 11,395,009 B2* | 7/2022 | Yin | ...................... | H04N 19/503 |
| 11,516,492 B2* | 11/2022 | Deshpande | .......... | H04N 19/184 |
| 11,563,934 B2* | 1/2023 | Chujoh | ................ | H04N 19/593 |
| 11,589,069 B2* | 2/2023 | Deshpande | .......... | H04N 19/172 |
| 11,601,668 B2* | 3/2023 | Yu | ........................ | H04N 19/107 |
| 2014/0328388 A1* | 11/2014 | Kim | ...................... | H04N 19/105 |
| | | | | 375/240.02 |
| 2015/0271515 A1* | 9/2015 | Pang | ...................... | H04N 19/70 |
| | | | | 375/240.16 |
| 2016/0316221 A1 | 10/2016 | Ikai et al. | | |
| 2016/0323573 A1 | 11/2016 | Ikai et al. | | |
| 2018/0302641 A1* | 10/2018 | Ikai | ...................... | H04N 19/196 |
| 2021/0136407 A1* | 5/2021 | Aono | .................... | H04N 19/55 |
| 2023/0027997 A1* | 1/2023 | Deshpande | .......... | H04N 19/167 |
| 2023/0353749 A1 | 11/2023 | Nam et al. | | |

OTHER PUBLICATIONS

Benjamin Bross et al., "Versatile Video Coding (Draft 7)", JVET-P2001-vE, Joint Video Experts Team (JVET) of ITU-T SG 16 WP 3 and ISO/IEC JTC 1/SC 29/WG 11, 16th Meeting: Geneva, CH, Oct. 1-11, 2019.

Notice of Allowance dated Sep. 8, 2022 for U.S. Appl. No. 17/122,919 which is the parent application of the instant application.

Non-final Rejection dated Oct. 5, 2021 for U.S. Appl. No. 17/122,919 which is the parent application of the instant application.

* cited by examiner

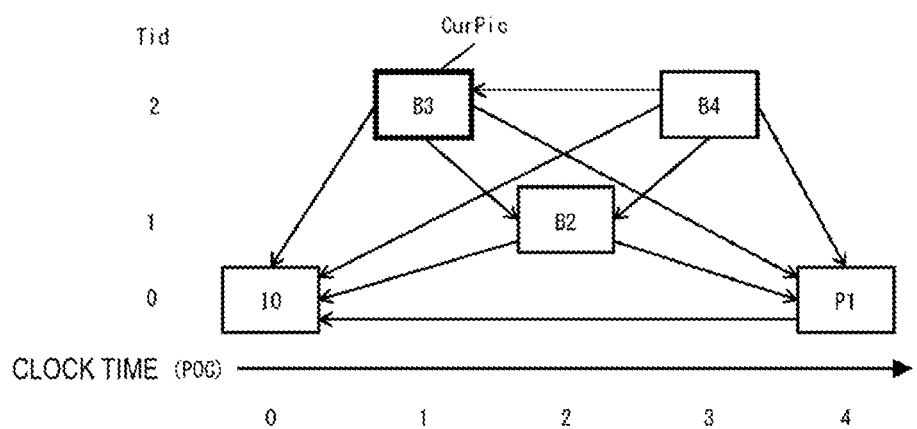
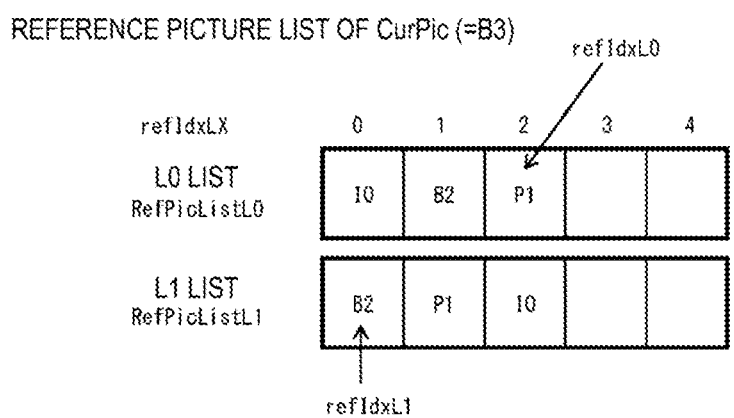
FIG. 6

FIG. 11A

| picture_header_rbsp( ) { | Descriptor |
|---|---|
| ... | |
| if( sps_temporal_mvp_enabled_flag ) { | |
|   pic_temporal_mvp_enabled_flag | u(1) |
|   if( pic_temporal_mvp_enabled_flag ) | |
|     collocated_ref_idx | ue(v) |
| } | |
| ... | |
| } | |

FIG. 11B

| slice_header( ) { | Descriptor |
|---|---|
| ... | |
| if( pic_temporal_mvp_enabled_flag ) { | |
|   if( slice_type == B && !pps_collocated_from_l0_idc ) | |
|     collocated_from_l0_flag | u(1) |
| } | |
| ... | |
| } | |

| Fractional sample position p | interpolation filter coefficients | | | | | | | |
|---|---|---|---|---|---|---|---|---|
| | $f_L[p][0]$ | $f_L[p][1]$ | $f_L[p][2]$ | $f_L[p][3]$ | $f_L[p][4]$ | $f_L[p][5]$ | $f_L[p][6]$ | $f_L[p][7]$ |
| 1 | 0 | 1 | −3 | 63 | 4 | −2 | 1 | 0 |
| 2 | −1 | 2 | −5 | 62 | 8 | −3 | 1 | 0 |
| 3 | −1 | 3 | −8 | 60 | 13 | −4 | 1 | 0 |
| 4 | −1 | 4 | −10 | 58 | 17 | −5 | 1 | 0 |
| 5 | −1 | 4 | −11 | 52 | 26 | −8 | 3 | −1 |
| 6 | −1 | 3 | −9 | 47 | 31 | −10 | 4 | −1 |
| 7 | −1 | 4 | −11 | 45 | 34 | −10 | 4 | −1 |
| 8 (hpelIfIdx == 0) | −1 | 4 | −11 | 40 | 40 | −11 | 4 | −1 |
| 8 (hpelIfIdx == 1) | 0 | 3 | 9 | 20 | 20 | 9 | 3 | 0 |
| 9 | −1 | 4 | −10 | 34 | 45 | −11 | 4 | −1 |
| 10 | −1 | 4 | −10 | 31 | 47 | −9 | 3 | −1 |
| 11 | −1 | 3 | −8 | 26 | 52 | −11 | 4 | −1 |
| 12 | 0 | 1 | −5 | 17 | 58 | −10 | 4 | −1 |
| 13 | 0 | 1 | −4 | 13 | 60 | −8 | 3 | −1 |
| 14 | 0 | 1 | −3 | 8 | 62 | −5 | 2 | −1 |
| 15 | 0 | 1 | −2 | 4 | 63 | −3 | 1 | 0 |

FIG. 16

| Fractional sample position p | interpolation filter coefficients | | | | | | | |
|---|---|---|---|---|---|---|---|---|
| | $f_1[p][0]$ | $f_1[p][1]$ | $f_1[p][2]$ | $f_1[p][3]$ | $f_1[p][4]$ | $f_1[p][5]$ | $f_1[p][6]$ | $f_1[p][7]$ |
| 0 | −1 | −5 | 17 | 42 | 17 | −5 | −1 | 0 |
| 1 | 0 | −5 | 15 | 41 | 19 | −5 | −1 | 0 |
| 2 | 0 | −5 | 13 | 40 | 21 | −4 | −1 | 0 |
| 3 | 0 | −5 | 11 | 39 | 24 | −4 | −2 | 1 |
| 4 | 0 | −5 | 9 | 38 | 26 | −3 | −2 | 1 |
| 5 | 0 | −5 | 7 | 38 | 28 | −2 | −3 | 1 |
| 6 | 1 | −5 | 5 | 36 | 30 | −1 | −3 | 1 |
| 7 | 1 | −4 | 3 | 35 | 32 | 0 | −4 | 1 |
| 8 | 1 | −4 | 2 | 33 | 33 | 2 | −4 | 1 |
| 9 | 1 | −4 | 0 | 32 | 35 | 3 | −4 | 1 |
| 10 | 1 | −3 | −1 | 30 | 36 | 5 | −5 | 1 |
| 11 | 1 | −3 | −2 | 28 | 38 | 7 | −5 | 0 |
| 12 | 1 | −2 | −3 | 26 | 38 | 9 | −5 | 0 |
| 13 | 1 | −2 | −4 | 24 | 39 | 11 | −5 | 0 |
| 14 | 0 | −1 | −4 | 21 | 40 | 13 | −5 | 0 |
| 15 | 0 | −1 | −5 | 19 | 41 | 15 | −5 | 0 |

FIG. 17

| Fractional sample position p | interpolation filter coefficients | | | | | | | |
|---|---|---|---|---|---|---|---|---|
| | $f_I[p][0]$ | $f_I[p][1]$ | $f_I[p][2]$ | $f_I[p][3]$ | $f_I[p][4]$ | $f_I[p][5]$ | $f_I[p][6]$ | $f_I[p][7]$ |
| 0 | −4 | 2 | 20 | 28 | 20 | 2 | −4 | 0 |
| 1 | −4 | 0 | 19 | 29 | 21 | 5 | −4 | −2 |
| 2 | −4 | −1 | 18 | 29 | 22 | 6 | −4 | −2 |
| 3 | −4 | −1 | 16 | 29 | 23 | 7 | −4 | −2 |
| 4 | −4 | −1 | 16 | 28 | 24 | 7 | −4 | −2 |
| 5 | −4 | −1 | 14 | 28 | 25 | 8 | −4 | −2 |
| 6 | −3 | −3 | 14 | 27 | 26 | 9 | −3 | −3 |
| 7 | −3 | −1 | 12 | 28 | 25 | 10 | −4 | −3 |
| 8 | −3 | −3 | 11 | 27 | 27 | 11 | −3 | −3 |
| 9 | −3 | −4 | 10 | 25 | 28 | 12 | −1 | −3 |
| 10 | −3 | −3 | 9 | 26 | 27 | 14 | −3 | −3 |
| 11 | −2 | −4 | 8 | 25 | 28 | 14 | −1 | −4 |
| 12 | −2 | −4 | 7 | 24 | 28 | 16 | −1 | −4 |
| 13 | −2 | −4 | 7 | 23 | 29 | 16 | −1 | −4 |
| 14 | −2 | −4 | 6 | 22 | 29 | 18 | −1 | −4 |
| 15 | −2 | −4 | 5 | 21 | 29 | 19 | 0 | −4 |

FIG. 18

| Fractional sample position p | interpolation filter coefficients | | | | | | | |
|---|---|---|---|---|---|---|---|---|
| | $f_L[p][0]$ | $f_L[p][1]$ | $f_L[p][2]$ | $f_L[p][3]$ | $f_L[p][4]$ | $f_L[p][5]$ | $f_L[p][6]$ | $f_L[p][7]$ |
| 1 | 0 | 1 | −3 | 63 | 4 | −2 | 1 | 0 |
| 2 | 0 | 1 | −5 | 62 | 8 | −3 | 1 | 0 |
| 3 | 0 | 2 | −8 | 60 | 13 | −4 | 1 | 0 |
| 4 | 0 | 3 | −10 | 58 | 17 | −5 | 1 | 0 |
| 5 | 0 | 3 | −11 | 52 | 26 | −8 | 2 | 0 |
| 6 | 0 | 2 | −9 | 47 | 31 | −10 | 3 | 0 |
| 7 | 0 | 3 | −11 | 45 | 34 | −10 | 3 | 0 |
| 8 | 0 | 3 | −11 | 40 | 40 | −11 | 3 | 0 |
| 9 | 0 | 3 | −10 | 34 | 45 | −11 | 3 | 0 |
| 10 | 0 | 3 | −10 | 31 | 47 | −9 | 2 | 0 |
| 11 | 0 | 2 | −8 | 26 | 52 | −11 | 3 | 0 |
| 12 | 0 | 1 | −5 | 17 | 58 | −10 | 3 | 0 |
| 13 | 0 | 1 | −4 | 13 | 60 | −8 | 2 | 0 |
| 14 | 0 | 1 | −3 | 8 | 62 | −5 | 1 | 0 |
| 15 | 0 | 1 | −2 | 4 | 63 | −3 | 1 | 0 |

FIG. 19

| Fractional sample position p | interpolation filter coefficients | | | |
|---|---|---|---|---|
| | $f_C[p][0]$ | $f_C[p][1]$ | $f_C[p][2]$ | $f_C[p][3]$ |
| 1 | −1 | 63 | 2 | 0 |
| 2 | −2 | 62 | 4 | 0 |
| 3 | −2 | 60 | 7 | −1 |
| 4 | −2 | 58 | 10 | −2 |
| 5 | −3 | 57 | 12 | −2 |
| 6 | −4 | 56 | 14 | −2 |
| 7 | −4 | 55 | 15 | −2 |
| 8 | −4 | 54 | 16 | −2 |
| 9 | −5 | 53 | 18 | −2 |
| 10 | −6 | 52 | 20 | −2 |
| 11 | −6 | 49 | 24 | −3 |
| 12 | −6 | 46 | 28 | −4 |
| 13 | −5 | 44 | 29 | −4 |
| 14 | −4 | 42 | 30 | −4 |
| 15 | −4 | 39 | 33 | −4 |
| 16 | −4 | 36 | 36 | −4 |
| 17 | −4 | 33 | 39 | −4 |
| 18 | −4 | 30 | 42 | −4 |
| 19 | −4 | 29 | 44 | −5 |
| 20 | −4 | 28 | 46 | −6 |
| 21 | −3 | 24 | 49 | −6 |
| 22 | −2 | 20 | 52 | −6 |
| 23 | −2 | 18 | 53 | −5 |
| 24 | −2 | 16 | 54 | −4 |
| 25 | −2 | 15 | 55 | −4 |
| 26 | −2 | 14 | 56 | −4 |
| 27 | −2 | 12 | 57 | −3 |
| 28 | −2 | 10 | 58 | −2 |
| 29 | −1 | 7 | 60 | −2 |
| 30 | 0 | 4 | 62 | −2 |
| 31 | 0 | 2 | 63 | −1 |

FIG. 20

| Fractional sample position p | interpolation filter coefficients | | | |
|---|---|---|---|---|
| | $f_c[p][0]$ | $f_c[p][1]$ | $f_c[p][2]$ | $f_c[p][3]$ |
| 0 | 12 | 40 | 12 | 0 |
| 1 | 11 | 40 | 13 | 0 |
| 2 | 10 | 40 | 15 | -1 |
| 3 | 9 | 40 | 16 | -1 |
| 4 | 8 | 40 | 17 | -1 |
| 5 | 8 | 39 | 18 | -1 |
| 6 | 7 | 39 | 19 | -1 |
| 7 | 6 | 38 | 21 | -1 |
| 8 | 5 | 38 | 22 | -1 |
| 9 | 4 | 38 | 23 | -1 |
| 10 | 4 | 37 | 24 | -1 |
| 11 | 3 | 36 | 25 | 0 |
| 12 | 3 | 35 | 26 | 0 |
| 13 | 2 | 34 | 28 | 0 |
| 14 | 2 | 33 | 29 | 0 |
| 15 | 1 | 33 | 30 | 0 |
| 16 | 1 | 31 | 31 | 1 |
| 17 | 0 | 30 | 33 | 1 |
| 18 | 0 | 29 | 33 | 2 |
| 19 | 0 | 28 | 34 | 2 |
| 20 | 0 | 26 | 35 | 3 |
| 21 | 0 | 25 | 36 | 3 |
| 22 | -1 | 24 | 37 | 4 |
| 23 | -1 | 23 | 38 | 4 |
| 24 | -1 | 22 | 38 | 5 |
| 25 | -1 | 21 | 38 | 6 |
| 26 | -1 | 19 | 39 | 7 |
| 27 | -1 | 18 | 39 | 8 |
| 28 | -1 | 17 | 40 | 8 |
| 29 | -1 | 16 | 40 | 9 |
| 30 | -1 | 15 | 40 | 10 |
| 31 | 0 | 13 | 40 | 11 |

FIG. 21

| Fractional sample position p | interpolation filter coefficients | | | |
|---|---|---|---|---|
| | $f_c[p][0]$ | $f_c[p][1]$ | $f_c[p][2]$ | $f_c[p][3]$ |
| 0 | 17 | 30 | 17 | 0 |
| 1 | 17 | 30 | 18 | −1 |
| 2 | 16 | 30 | 18 | 0 |
| 3 | 16 | 30 | 18 | 0 |
| 4 | 15 | 30 | 18 | 1 |
| 5 | 14 | 30 | 18 | 2 |
| 6 | 13 | 29 | 19 | 3 |
| 7 | 13 | 29 | 19 | 3 |
| 8 | 12 | 29 | 20 | 3 |
| 9 | 11 | 28 | 21 | 4 |
| 10 | 10 | 28 | 22 | 4 |
| 11 | 10 | 27 | 22 | 5 |
| 12 | 9 | 27 | 23 | 5 |
| 13 | 9 | 26 | 24 | 5 |
| 14 | 8 | 26 | 24 | 6 |
| 15 | 7 | 26 | 25 | 6 |
| 16 | 7 | 25 | 25 | 7 |
| 17 | 6 | 25 | 26 | 7 |
| 18 | 6 | 24 | 26 | 8 |
| 19 | 5 | 24 | 26 | 9 |
| 20 | 5 | 23 | 27 | 9 |
| 21 | 5 | 22 | 27 | 10 |
| 22 | 4 | 22 | 28 | 10 |
| 23 | 4 | 21 | 28 | 11 |
| 24 | 3 | 20 | 29 | 12 |
| 25 | 3 | 19 | 29 | 13 |
| 26 | 3 | 19 | 29 | 13 |
| 27 | 2 | 18 | 30 | 14 |
| 28 | 1 | 18 | 30 | 15 |
| 29 | 0 | 18 | 30 | 16 |
| 30 | 0 | 18 | 30 | 16 |
| 31 | −1 | 18 | 30 | 17 |

| seq_parameter_set_rbsp( ) { | Descriptor |
|---|---|
| sps_decoding_parameter_set_id | ue(4) |
| sps_video_parameter_set_id | ue(4) |
| ... | |
| sps_weighted_pred_flag | u(1) |
| sps_weighted_bipred_flag | u(1) |
| ... | |
| } | |

FIG. 28B

| pic_parameter_set_rbsp( ) { | Descriptor |
|---|---|
| pps_pic_parameter_set_id | ue(v) |
| pps_seq_parameter_set_id | ue(v) |
| ... | |
| pps_weighted_pred_flag | u(1) |
| pps_weighted_bipred_flag | u(1) |
| ... | |
| } | |

FIG. 28C

| slice_header( ) { | Descriptor |
|---|---|
| ... | |
| if( slice_type != I ) { | |
| ... | |
| if( ( pps_weighted_pred_flag && slice_type == P ) \|\| ( pps_weighted_bipred_flag && slice_type == B ) ) | |
| pred_weight_table( ) | |
| } | |
| ... | |
| } | |

| pred_weight_table( ) { | Descriptor |
|---|---|
|   luma_log2_weight_denom | ue(v) |
|   if( ChromaArrayType != 0 ) | |
|     delta_chroma_log2_weight_denom | se(v) |
|   for( i = 0; i < NumRefIdxActive[ 0 ]; i++ ) | |
|     luma_weight_l0_flag[ i ] | u(1) |
|   if( ChromaArrayType != 0 ) | |
|     for( i = 0; i < NumRefIdxActive[ 0 ]; i++ ) | |
|       chroma_weight_l0_flag[ i ] | u(1) |
|   for( i = 0; i < NumRefIdxActive[ 0 ]; i++ ) { | |
|     if( luma_weight_l0_flag[ i ] ) { | |
|       delta_luma_weight_l0[ i ] | se(v) |
|       luma_offset_l0[ i ] | se(v) |
|     } | |
|     if( chroma_weight_l0_flag[ i ] ) | |
|       for( j = 0; j < 2; j++ ) { | |
|         delta_chroma_weight_l0[ i ][ j ] | se(v) |
|         delta_chroma_offset_l0[ i ][ j ] | se(v) |
|       } | |
|   } | |
|   if( slice_type == B ) { | |
|     for( i = 0; i < NumRefIdxActive[ 1 ]; i++ ) | |
|       luma_weight_l1_flag[ i ] | u(1) |
|     if( ChromaArrayType != 0 ) | |
|       for( i = 0; i < NumRefIdxActive[ 1 ]; i++ ) | |
|         chroma_weight_l1_flag[ i ] | u(1) |
|     for( i = 0; i < NumRefIdxActive[ 1 ]; i++ ) { | |
|       if( luma_weight_l1_flag[ i ] ) { | |
|         delta_luma_weight_l1[ i ] | se(v) |
|         luma_offset_l1[ i ] | se(v) |
|       } | |
|       if( chroma_weight_l1_flag[ i ] ) | |
|         for( j = 0; j < 2; j++ ) { | |
|           delta_chroma_weight_l1[ i ][ j ] | se(v) |
|           delta_chroma_offset_l1[ i ][ j ] | se(v) |
|         } | |
|     } | |
|   } | |
| } | |

FIG. 29

| coding_unit( x0, y0, cbWidth, cbHeight, cqtDepth, treeType, modeType ) { | Descriptor |
|---|---|
| ... | |
| if( slice_type != I || sps_ibc_enabled_flag || sps_palette_enabled_flag) { | |
| ... | |
| if( sps_bcw_enabled_flag && inter_pred_idc[ x0 ][ y0 ] == PRED_BI && !WeightedPredFlag( B, 0, ref_idx_l0, ref_idx_l1 ) && !WeightedPredFlag( B, 1, ref_idx_l0, ref_idx_l1 ) && cbWidth * cbHeight >= 256 ) | |
| bcw_idx[ x0 ][ y0 ] | ae(v) |
| } | |
| ... | |
| } | |

| seq_parameter_set_rbsp( ) { | Descriptor |
|---|---|
| sps_decoding_parameter_set_id | ue(4) |
| sps_video_parameter_set_id | ue(4) |
| ... | |
| sps_weighted_pred_flag | u(1) |
| sps_weighted_bipred_flag | u(1) |
| ... | |
| } | |

FIG. 31B

| picture_header_rbsp( ) { | Descriptor |
|---|---|
| ... | |
| ph_pic_parameter_set_id | ue(v) |
| ... | |
| if(sps_weighted_pred_flag) | |
|   pic_weighted_pred_flag | u(1) |
| if(sps_weighted_bipred_flag) | |
|   pic_weighted_bipred_flag | u(1) |
| ... | |
| } | |

FIG. 31C

| slice_header( ) { | Descriptor |
|---|---|
| ... | |
| if( slice_type != I ) { | |
| ... | |
| if( ( pic_weighted_pred_flag && slice_type == P ) \|\| | |
|   ( pic_weighted_bipred_flag && slice_type == B ) ) | |
|   pred_weight_table( ) | |
| } | |
| ... | |
| } | |

VIDEO DECODING APPARATUS

CROSS-REFERENCE TO RELATED APPLICATIONS

The present application is a continuation application of U.S. patent application Ser. No. 17/122,919, filed on Dec. 15, 2020, which claims priority from Japanese Application 2019-227057, the content of which is hereby incorporated by reference into this application.

BACKGROUND

Technical Field

Embodiments of the disclosure relate to a prediction image generation apparatus, a video decoding apparatus, and a video coding apparatus.

A video coding apparatus which generates coded data by coding videos and a video decoding apparatus which generates decoded images by decoding the coded data are used for efficient transmission or recording of videos.

Examples of specific video coding schemes include an H.264/AVC scheme and an H.265/high-efficiency video coding (HEVC) scheme.

In such video coding schemes, images (pictures) configuring a video are managed using a hierarchical structure of slices obtained by splitting the images, coding tree units (CTUs) obtained by splitting the slices, coding units (also referred to as CUs) obtained by splitting the coding tree units, and transform units (TUs) obtained by splitting the coding units, and the images are coded/decoded for each CU.

Typically, in such video coding schemes, prediction images are generated based on locally decoded images obtained by coding/decoding input images, and prediction errors (also referred to as "difference images" or "residual images") obtained by subtracting the prediction images from the input images (original images) are coded. As a method for generating the prediction images, inter-picture prediction (inter prediction) and intra-picture prediction (intra prediction) may be exemplified.

Also, as recent video coding and decoding technologies, "Versatile Video Coding (Draft 7)," JVET-P2001-vE, Joint Video Exploration Team (JVET) of ITU-T SG 16 WP 3 and ISO/IEC JTC 1/SC 29/WG 11, 2019-11-14 may be exemplified.

In "Versatile Video Coding (Draft 7)," JVET-P2001-vE, Joint Video Exploration Team (JVET) of ITU-T SG 16 WP 3 and ISO/IEC JTC 1/SC 29/WG 11, 2019-11-14, technologies for motion vector predicting in a time direction have been introduced. Thus, slice header information states an index value for defining from which collocated picture a motion vector is used for motion vector prediction in a case that a plurality of collocated pictures that can be referred to are present.

SUMMARY

However, "Versatile Video Coding (Draft 7)," JVET-P2001-vE, Joint Video Exploration Team (JVET) of ITU-T SG 16 WP 3 and ISO/IEC JTC 1/SC 29/WG 11, 2019-11-14 defines that the index value indicating the collocated picture is the same value for all slices in a coded picture, as a requirement to be satisfied by coded data. There is thus a problem that in a case that a plurality of slices are present for one picture, the same value is to be designated a plurality of times, which is redundant.

According to an aspect of the disclosure, there is provided a video decoding apparatus including: an adaptive motion vector prediction unit configured to adaptively perform spatial prediction that performs prediction using a motion vector around a target block and temporal prediction that performs prediction using a motion vector of a collocated picture, in which in the temporal prediction performed by the adaptive motion vector prediction unit, the collocated picture to be referred to is designated on a per picture basis, and a reference list is designated on a per slice basis.

According to an aspect of the disclosure, there is provided a video coding apparatus including: an adaptive motion vector prediction unit configured to adaptively perform spatial prediction that performs prediction using a motion vector around a target block and temporal prediction that performs prediction using a motion vector of a collocated picture, in which in the temporal prediction performed by the adaptive motion vector prediction unit, the collocated picture to be referred to is designated on a per picture basis, and a reference list is designated on a per slice basis.

According to an aspect of the disclosure, there is provided a prediction image generation method including an adaptive motion vector prediction unit configured to adaptively perform spatial prediction that performs prediction using a motion vector around a target block and temporal prediction that performs prediction using a motion vector of a collocated picture, in which in the temporal prediction performed by the adaptive motion vector prediction unit, the collocated picture to be referred to is designated on a per picture basis, and a reference list is designated on a per slice basis.

According to the aspects of the disclosure, it is possible to designate an index indicating one collocated picture with a coded picture in video coding and decoding processing, to reduce redundancy, and to solve the aforementioned problem.

BRIEF DESCRIPTION OF DRAWINGS

The disclosure will be described with reference to the accompanying drawings, wherein like numbers reference like elements.

FIG. 6 is a conceptual diagram illustrating an example of reference pictures and a reference picture list.

FIGS. 11A and 11B are diagrams illustrating a configuration example of syntax tables of a picture header and a slice header.

FIG. 16 is a table related to coefficient derivation in interpolation filter processing.

FIG. 17 is a table related to coefficient derivation in interpolation filter processing.

FIG. 18 is a table related to coefficient derivation in interpolation filter processing.

FIG. 19 is a table related to coefficient derivation in interpolation filter processing.

FIG. 20 is a table related to coefficient derivation in interpolation filter processing.

FIG. 21 is a table related to coefficient derivation in interpolation filter processing.

FIG. 22 is a table related to coefficient derivation in interpolation filter processing.

FIGS. 28A, 28B and 28C are diagrams for explaining syntax of coding parameters in weight prediction.

FIG. 29 is a diagram for explaining syntax of coding parameters in weight prediction.

FIG. 30 is a diagram for explaining syntax for BCW prediction.

FIGS. 31A, 31B and 31C are diagrams for explaining syntax of coding parameters in weight prediction

DESCRIPTION OF EMBODIMENTS

First Embodiment

Hereinafter, embodiments of the disclosure will be described with reference to the drawings.

Figure 1:
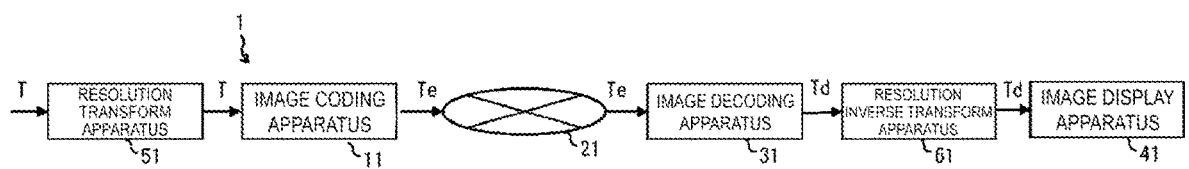
FIG. 1 is a schematic diagram illustrating a configuration of an image transmission system according to the present embodiment.

FIG. 1 is a schematic diagram illustrating a configuration of an image transmission system 1 according to the present embodiment.

The image transmission system is a system that transmits a coding stream obtained by coding an image with a different resolution obtained by transforming a resolution, decodes the transmitted coding stream to inversely transform the image to have an original resolution, and displays the inversely transformed image. The image transmission system 1 is configured to include a resolution transform apparatus (resolution transform unit) 51, a video coding apparatus (image coding apparatus) 11, a network 21, a video decoding apparatus (image decoding apparatus) 31, a resolution inverse transform apparatus (resolution inverse transform unit) 61, and a video display apparatus (image display apparatus) 41.

The resolution transform apparatus 51 transforms a resolution of an image T included in a video and supplies a variable resolution video signal including images with different resolutions to the image coding apparatus 11. Also, the resolution transform apparatus 51 supplies information indicating whether or not resolutions of the images have been transformed to the video coding apparatus 11. In a case that the information indicates that resolutions have been transformed, the video coding apparatus configures resolution transform information ref_pic_resampling_enabled_flag, which will be described later, to 1 and performs coding with the resolution conversion information included in a sequence parameter set SPS of coded data.

The image T with a transformed resolution is input to the video coding apparatus 11.

The network 21 transmits the coding stream Te generated by the video coding apparatus 11 to the video decoding apparatus 31. The network 21 is the Internet, a wide area network (WAN), a local area network (LAN), or a combination thereof. The network 21 is not necessarily limited to a bidirectional communication network and may be a unidirectional communication network configured to transmit broadcast waves of digital terrestrial television broadcasting, satellite broadcasting, or the like. Also, the network 21 may be replaced with a recording medium that records the coding stream Te such as a Digital Versatile Disc (DVD: registered trademark) or a Blue-ray Disc (BD: registered trademark).

The video decoding apparatus 31 decodes each coding stream Te transmitted through the network 21, generates a variable resolution decoded image signal, and supplies the variable resolution decoded image signal to the resolution inverse transform apparatus 61.

In a case that resolution transform information included in the variable resolution decoded image signal indicates that the resolution has been transformed, the resolution inverse transform apparatus 61 generates a decoded image signal with an original size by inversely transforming the image with the transformed resolution.

The video display apparatus 41 displays all or some of one or a plurality of decoded images Td represented by the decoded image signal input from the resolution inverse transform unit. The video display apparatus 41 includes, for example, a display device such as a liquid crystal display or an organic electro-luminescence (EL) display. Examples of a form of the display include a stationary type, a mobile type, an HMD type, and the like. Also, an image with high image quality is displayed in a case that the video decoding apparatus 31 has high processing ability, and an image that does not require a high processing ability and a display ability is displayed in a case that the video decoding apparatus 31 has only a low processing ability.

Figure 5:
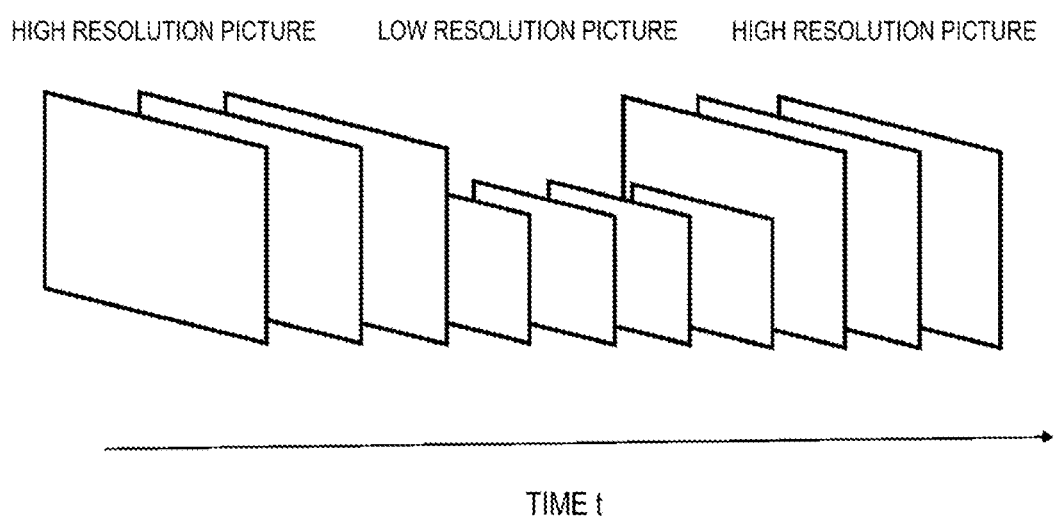
FIG. 5 is a conceptual diagram of an image as a target of processing performed by the image transmission system according to the present embodiment.

FIG. 5 is a conceptual diagram of an image that is a target of processing performed by the image transmission system 1 illustrated in FIG. 1 and is a diagram illustrating a change in resolution of the image with elapse of time. However, whether or not the image has been coded is not distinguished in FIG. 5. FIG. 5 illustrates an example in which the image is transmitted to the image decoding apparatus 31 with a reduced resolution in the process of the processing performed by the image transmission system 1. As illustrated in FIG. 5, the resolution transform apparatus 51 typically performs transform of reducing the resolution of the image to reduce the amount of information to be transmitted.

Operators

Operators used in the present specification will be described below.

>> denotes a right bit shift, << denotes a left bit shift, & denotes a bitwise AND, | denotes a bitwise OR, |= denotes an OR assignment operator, and || denotes a logical sum.

x? y:z is a ternary operator to take y in a case that x is true (other than 0) and take z in a case that x is false (0).

Clip3(a, b, c) is a function to clip c to a value equal to or greater than a and equal to or less than b, and a function to return a in a case that c<a, return b in a case that c>b, and return c in the other cases (however, a<=b).

abs(a) is a function that returns an absolute value of a.

Int(a) is a function that returns an integer value of a.

floor(a) is a function that returns a maximum integer that is equal to or less than a.

ceil(a) is a function that returns a minimum integer that is equal to or greater than a.

a/d represents a division of a by d (rounded down to the nearest decimal).

Structure of Coding Stream Te

Prior to detailed description of the video coding apparatus 11 and the video decoding apparatus 31 according to the present embodiment, a data structure of the coding stream Te generated by the video coding apparatus 11 and decoded by the video decoding apparatus 31 will be described.

Figure 4:
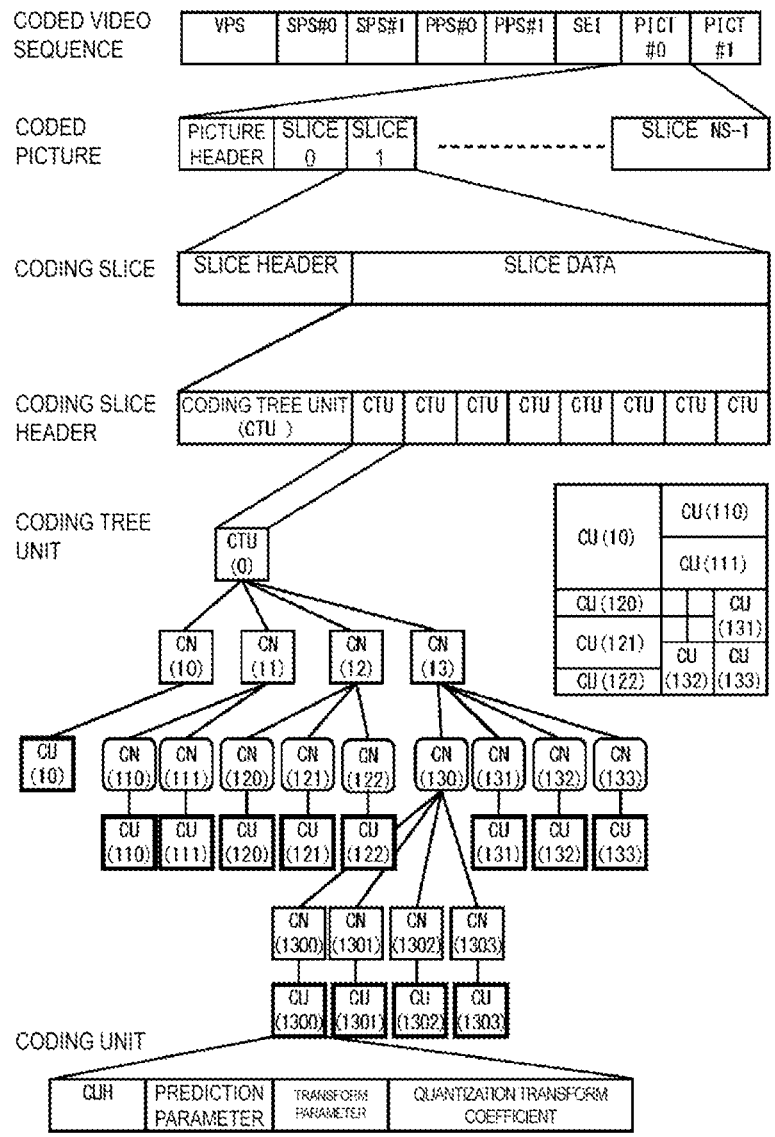
FIG. 4 is a diagram illustrating a hierarchical structure of data in a coding stream.

FIG. 4 is a diagram illustrating a hierarchical structure of data of the coding stream Te. The coding stream Te includes a sequence and a plurality of pictures configuring the sequence in an illustrative example. FIG. 4 is a diagram illustrating a coded video sequence that defines a sequence SEQ, coded pictures that define pictures PICT, coding slices that define slices S, coding slice data that defines slice data, coding tree units included in the coding slice data, and coding units included in the coding tree units.

Coding Video Sequence

In a coding video sequence, a set of data referred to by the video decoding apparatus 31 to decode the sequence SEQ to be processed is defined. The sequence SEQ includes a video parameter set VPS, a sequence parameter set SPS, a picture parameter set PPS, an adaptation parameter set APS, a picture PICT, and supplemental enhancement information SEI as illustrated in FIG. 4.

In the video parameter set VPS, a set of coding parameters common to a plurality of videos and a set of coding parameters related to a plurality of layers and individual layers included in the videos are defined in the videos including a plurality of layers.

In the sequence parameter set SPS, a set of coding parameters referred to by the video decoding apparatus 31 to decode a target sequence is defined. For example, a width and a height of a picture are defined. Note that a plurality of SPSs may be present. In that case, any of the plurality of SPSs is selected from the PPS.

Here, the sequence parameter set SPS includes the following syntax.

ref_pic_resampling_enabled_flag: a flag that defines whether or not to use a function of making a resolution variable (resampling) in a case that each image included in a single sequence that refers to a target SPS is decoded. In another aspect, the flag is a flag indicating that the size of the reference picture to be referred to in generation of a prediction image changes between images indicated by the single sequence. The aforementioned resampling is applied in a case that the value of the flag is 1, and the resampling is not applied in a case that the value is 0.

pic_width_max_in_luma_samples: syntax that designates, on a per luminance block basis, the width of an image with the maximum width among the images in the single sequence. Also, the value of the syntax is required not to be 0 and to be an integer multiple of Max (8, MinCbSizeY).

Here, MinCbSizeY is a value determined by the minimum size of the luminance block.

pic_height_max_in_luma_samples: syntax that designates, on a per luminance block basis, the height of an image with the maximum height among images in the single sequence. Also, the value of the syntax is required not to be 0 and to be an integer multiple of Max (8, MinCbSizeY).

sps_temporal_mvp_enabled_flag: a flag that defines whether or not to use temporal motion vector prediction in a case that a target sequence is decoded. Temporal motion vector prediction is used in a case that the value of the flag is 1, and the temporal motion vector prediction is not used in a case that the value is 0. Also, it is possible to prevent a coordinate position to be referred to from deviating by defining the flag in a case that reference pictures with different resolutions are referred to.

In the picture parameter set PPS, a set of coding parameters referred to by the video decoding apparatus 31 to decode each picture in a target sequence is defined. For example, a reference value (pic_init_qp_minus26) of a quantization step size used for decoding a picture and a flag (weighted_pred_flag) indicating an application of a weighted prediction are included. Note that a plurality of PPSs may be present. In that case, any of the plurality of PPSs is selected from each picture in the target sequence.

Here, the picture parameter set PPS includes the following syntax.

pic_width_in_luma_samples: syntax that designates the width of a target picture. The value of the syntax is required not to be 0, to be an integer multiple of Max (8, MinCbSizeY), and to be a value of equal to or less than pic_width_max_in_luma_samples.

pic_height_in_luma_samples: syntax that designates the height of the target picture. The value of the syntax is required not to be 0, to be an integer multiple of Max (8, MinCbSizeY), and to be a value of equal to or less than pic_height_max_in_luma_samples.

conformance_window_flag: a flag indicating whether or not conformance (clopping) window offset parameters are to be continuously signaled and a flag indicating a location at which a conformance window is to be displayed. This parameter is signaled in a case that the flag is 1, and a case in which the flag is 0 indicates that there is no conformance window offset parameter.

conf_win_left_offset, conf_win_right_offset, conf_win_top_offset, and conf_win_bottom_offset: offset values for designating left, right, upper, and lower positions of a picture output in decoding processing in relation to a rectangular region designated by picture coordinates for output. In a case that the value of conformance_window_flag is 0, the values of conf_win_left_offset, conf_win_right_offset, conf_win_top_offset, and conf_win_bottom_offset are estimated to be 0.

scaling_window_flag: a flag indicating whether or not a scaling window offset parameter is present in the target PPS and a flag related to definition of the size of an image to be output. A case in which the flag is 1 indicates that the parameter is present in the PPS, and a case in which the flag is 0 indicates that the parameter is not present in the PPS. Also, in a case that the value of ref_pic_resampling_enabled_flag is 0, the value of scaling_window_flag is required to be 0.

scaling_win_left_offset, scaling_win_right_offset, scaling_win_top_offset, and scaling_win_bottom_offset: syntax that designates an offset to be applied to an image size for calculating a scaling ratio on a per luminance sample basis in regard to left, right, upper, and lower positions of the target picture. Also, in a case that the value of scaling_window_flag is zero, the values of scaling_win_left_offset, scaling_win_right_offset, scaling_win_top_offset, and scaling_win_bottom_offset are estimated to be zero. Also, the value of scaling_win_left_offset+scaling_win_right_offset is required to be less than pic_width_in_luma_samples, and the value of scaling_win_top_offset+scaling_win_bottom_offset is required to be less than pic_height_in_luma_samples.

The width PicOutputWidthL and the height PicOutputHeightL of a picture to be output are derived as follows.

```
PicOutputWidthL=pic_width_in_luma_samples-
    (scaling_win_right_offset+scaling_win_left_off-
    set)
PicOutputHeightL=pic_height_in_pic_size_units-
    (scaling_win_bottom_offset+
    scaling_win_top_offset)
``` pps_collocated_from_l0_idc: syntax indicating whether or not collocated_from_l0_flag is present in a slice header of a slice that refers to the corresponding PPS. A case in which the value of the syntax is 0 indicates that collocated_from_l0_flag is present in the slice header, and a case in which the value is 1 or 2 indicates that collocated_from_l0_flag is not present in the slice header.

Coded Picture

In a coded picture, a set of data referred to by the video decoding apparatus 31 to decode a picture PICT to be processed is defined. The picture PICT includes a picture header PH and slices 0 to NS-1 (NS is a total number of slices included in the picture PICT) as illustrated in FIG. 4.

Hereinafter, in a case that it is not necessary to distinguish each of the slices 0 to NS-1, the slices 0 to NS-1 may be denoted with indexes of signs omitted. Also, the same applies to other data with indexes applied thereto included in the coding stream Te, which will be described below.

The picture header includes the following syntax.

pic_temporal_mvp_enabled_flag: a flag that defines whether or not to use temporal motion vector prediction for inter prediction of a slice associated with the picture header. In a case that the value of the flag is 0, a syntax element of the slice associated with the picture header is limited such that temporal motion vector prediction is not used for decoding the slice. A case in which the value of the flag is 1 indicates that temporal motion vector prediction is used for decoding the slice associated with the picture header. In a case that the flag has not been defined, the value is estimated to be 0.

Coding Slice

In the coding slice, a set of data referred to by the video decoding apparatus 31 to decode a slice S to be processed is defined. As illustrated in FIG. 4, the slice includes a slice header and slice data.

The slice header includes a coding parameter group referred to by the video decoding apparatus 31 to determine a decoding method for a target slice. Slice type designation information (slice_type) designating a slice type is one example of a coding parameter included in the slice header.

Examples of slice types that can be designated by the slice type designation information include (1) an I slice using only intra prediction in coding, (2) a P slice using single prediction (L0 prediction) or intra prediction in coding, (3) a B slice using single prediction (L0 prediction or L1 prediction), dual prediction, or intra prediction in coding, and the like. Note that the inter prediction is not limited to single prediction or dual prediction, and a greater number of reference pictures may be used to generate a prediction image. Hereinafter, in a case that a slice is referred to as a P or B slice, it indicates a slice including a block that can use inter prediction.

Note that the slice header may include a reference to the picture parameter set PPS (pic parameter set id).

Figure 9:
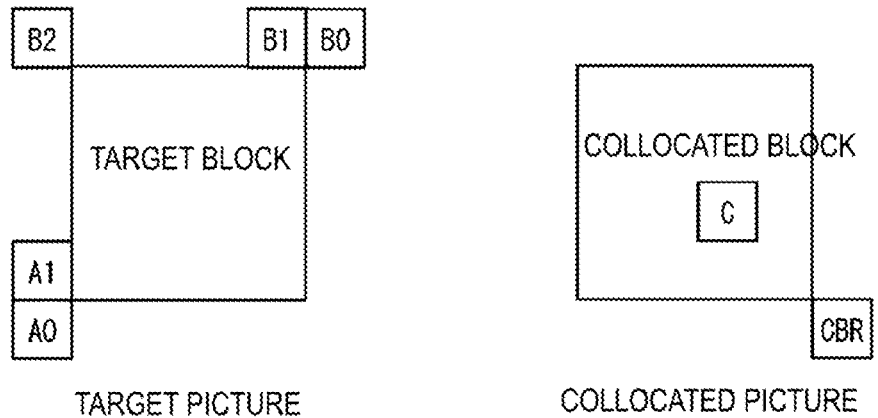
FIG. 9 is a diagram illustrating a configuration example of a syntax table of a slice header.

Also, the slice header can include the following syntax as illustrated in FIG. 9.

collocated_from_l0_flag: a flag that defines from which reference picture list a collocated picture used for temporal motion vector prediction is to be derived. A case in which the value of the flag is 1 indicates that the picture is to be derived from a reference picture list 0 (L0 list), and a case in which the value of the flag is 0 indicates that the picture is to be derived from a reference picture list 1 (L1 list). Also, in a case that the flag has not been defined, a value of 0 or 1 is estimated in accordance with the type of the slice and pps_collocated_from_l0_idc.

In a case that the slice type is other than B, collocated_from_l0_flag is estimated to be 1. In a case that the slice type is B, collocated_from_l0_flag is estimated to be pps_collocated_from_l0_idc-1.

collocated_ref_idx: a reference index of a collocated picture to be used for temporal motion vector prediction, Also, the value of collocated_ref_idx is defined by the type of a slice or the value of collocated_from_l0_flag. In a case that the slice type is P, or in a case that the slice type is B and collocated_from_l0_flag is 1, a picture in List0 is to be referred to for collocated_ref_idx. In a case that the slice type is B and collocated_from_l0_flag is 0, a picture in List1 is to be referred to for collocated_ref_idx. In a case that collocated_ref_idx is not present, the value is estimated to be 0.

In the present embodiment, in a case that the value of a variable RefPicIsScaled [collocated_from_l0_flag?0:1][collocated_ref_idx] indicating that the size of the coded picture and the size of the reference picture are different from each other is 1, a variable SliceTemporalMvpEnableFlag is configured to 0. Otherwise, the variable SliceTemporalMvpEnableFlag is configured to the value of pic_temporal_mvp_enabled_flag.

In this manner, in a case that the reference picture with a size that is different from the size of the coded picture is designated with collocated_ref_idx, the variable SliceTemporalMvpEnableFlag is forcibly configured to 0, and coding and decoding processing is then performed on the slice without using motion vector information of the reference picture.

Figure 10:
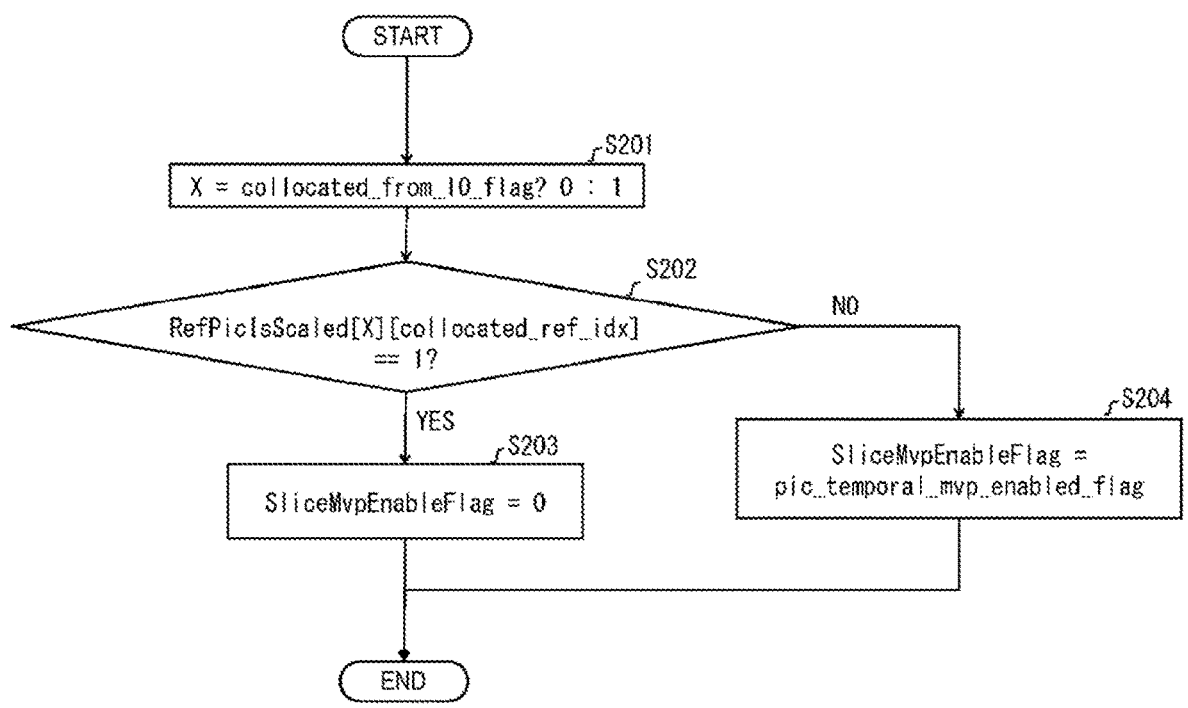
FIG. 10 is a flowchart illustrating an example of processing according to the present application.

FIG. 10 illustrates the aforementioned processing using a flow diagram. First, the value of collocated_from_l0_flag that is a flag defining which of the reference picture lists L0 and L1 the collocated picture to be used for temporal motion vector prediction is to be derived is put into a variable X. (S201) Next, comparison is made to check whether or not the value of the variable RefPicIsScaled is 1 in order to examine whether the size of the collocated picture indicated by collocated_ref_idx is different from the size of the coded picture. (S202) In a case that the value is 1, then it is determined that the size of the collocated picture is different from the size of the coded picture, the variable SliceTemporalMvpEnableFlag is configured to 0, and motion vector information of the collocated picture is not used. (S203) In a case that the value is not 1, then the value of picTemporalMvpEnableFlag that is a flag in a picture level is put into the variable SliceTemporalMvpEnableFlag. (S204) In another embodiment, in a case that the reference picture with a size that is different from the size of the coded picture is designated with collocated_ref_idx, the smallest value of ref_idx of a reference picture with the same size as the size of the coded picture is defined as collocated_ref_idx.

Otherwise, in a case that the reference picture with the same size as the size of the coded picture is not present, a scheme in which the variable SliceTemporalMvpEnableFlag is forcibly configured to 0 and coding and decoding processing is performed on the slice without using motion vector information of the reference picture may be employed.

In both cases, in a case that the reference picture with a size that is different from the size of the coded picture is designated with collocated_ref_idx, a procedure through which always the same operations are performed in the decoding processing is configured.

In this manner, processing to be performed in a case that collocated_ref_idx indicating a reference picture with a size that is different from the size of the coded picture is decoded is defined rather than inhibiting generation of the coded data including such collocated_ref_idx. This can ensure that always the same operations are performed in the decoding processing.

"Versatile Video Coding (Draft 7)," JVET-P2001-vE, Joint Video Exploration Team (JVET) of ITU_T SG 16 WP 3 and ISO/IEC JTC 1/SC 29/WG 11, 2019-11-14 defines that the value of collocated_ref_idx is to be configured to the same value for all slices in a coded picture as a requirement to be satisfied by coded data. Thus, there is a problem in that in a case that a plurality of slices are present in one picture, the same value is to be designated a plurality of times, which is redundant.

Thus, collocated_ref_idx is designated with a picture header PH as in FIGS. 11A and 11B in another embodiment.

FIG. 11A illustrates a part of syntax of the picture header PH.

The value of pic_temporal_mvp_enabled_flag is decoded in a case that a target sequence is decoded, and in a case that sps_temporal_mvp_enabled_flag is 1, and collocated_ref_idx is decoded in a case that pic_temporal_mvp_enabled_flag is 1. sps_temporal_mvp_enabled_flag is a flag that defines whether or not to use temporal motion vector prediction.

In a case that slice_type of a slice associated with the picture header PH is equal to P, or in a case that slice_type of a slice associated with the picture header PH is equal to B and collocated_from_l0_flag of the slice associated with the picture header PH is 1, a picture in list 0 is to be referred to for collocated_ref_idx.

In a case that slice_type of a slice associated with the picture header PH is equal to B and collocated_from_l0_flag of the slice associated with the picture header PH is equal to 0, a picture in list 1 is to be referred to for collocated_ref_idx.

In a case that collocated_ref_idx is not present, the value of collocated_ref_idx is estimated to be equal to 0.

In a case that a reference index indicated by collocated_ref_idx is not present in the slice associated with the picture header PH, the variable SliceTemporalMvpEnableFlag of the slice associated with PH is configured to 0.

In a case that RefPicIsScaled [collocated_from_l0_flag?0:1][collocated_ref_idx] of the slice associated with the picture header PH is equal to 1, the variable SliceTemporalMvpEnableFlag of the slice associated with the picture header PH is configured to 0.

Otherwise, the variable SliceTemporalMvpEnableFlag is configured to pic_temporal_mvp_enabled_flag.

FIG. 11B illustrates a part of syntax of a slice header.

In a case that the value of pic_temporal_mvp_enabled_flag is 1, slice_type of the slice is equal to B, and in a case that the value of pps_collocated_from_l0_idc is 0, collocated_from_l0_flag is designated.

A case in which the value of collocated_from_l0_flag is 1 indicates that the picture is to be derived from the reference picture list 0 (L0 list), and a case in which the value of the flag is 0 indicates that the picture is to be derived from the reference picture list 1 (L1 list). Also, in a case that the flag has not been defined, a value of 0 or 1 is estimated in accordance with the type of the slice and pps_collocated_from_l0_idc.

In a case that the slice type is other than B, collocated_from_l0_flag is estimated to be 1. In a case that the slice type is B, collocated_from_l0_flag is estimated to be pps_collocated_from_l0_idc-1.

It is possible to designate an index indicating one collocated picture for a coded picture without designating the same value a plurality of times even in a case that a plurality of slices are present in a picture, by using the syntax as described above. It is thus possible to reduce redundancy and to solve the aforementioned problem.

Coding Slice Data

In coding slice data, a set of data referred to by the video decoding apparatus 31 to decode slice data to be processed is defined. The slice data includes a CTU as illustrated in the coding slice header in FIG. 4. A CTU is a block with a fixed size (for example, 64×64) configuring a slice and may be called a largest coding unit (LCU).

Coding Tree Unit

In FIG. 4, a set of data referred to by the video decoding apparatus 31 to decode a CTU to be processed is defined. The CTU is split into coding units CU that are basic units of coding processing through recursive quad tree (QT) splitting, binary tree (BT) splitting, or ternary tree (TT) splitting. The BT splitting and the TT splitting will be collectively referred to as multi tree (MT) splitting. Nodes of a tree structure obtained through the recursive quad tree splitting will be referred to as coding nodes. Intermediate nodes of the quad tree, the binary tree, and the ternary tree are coding nodes, and the CTU itself is also defined as a highest coding node.

A CT includes, as CT information, a CU splitting flag (split_cu_flag) indicating whether or not to perform CT splitting, a QT splitting flag (qt_split_cu_flag) indicating whether or not to perform QT splitting, an MT splitting direction (mtt_split_cu_vertical_flag) indicating a splitting direction in the MT splitting, and an MT splitting type (mtt_split_cu_binary_flag) indicating a splitting type of the MT splitting, split_cu_flag, qt_split_cu_flag, mtt_split_cu_vertical_flag, and mtt_split_cu_binary_flag are transmitted for each coded node.

Different trees may be used for luminance and chrominance. The type of the tree is indicated by treeType. In a case that a common tree is used for luminance (Y, cIdx=0) and chrominance (Cb/Cr, cIdx=1, 2), for example, a single common tree is indicated by treeType=SINGLE_TREE. In a case that two different trees (dual trees) are used for luminance and chrominance, the luminance tree is indicated by treeType=DUAL_TREE_LUMA, and the chrominance tree is indicated by treeType=DUAL_TREE_CHROMA.

Coding Unit

In FIG. 4, a set of data referred to by the video decoding apparatus 31 to decode a coding unit to be processed is defined. Specifically, a CU includes a CU header CUH, a prediction parameter, a transform parameter, a quantization transform coefficient, and the like. In the CU header, a prediction mode and the like are defined.

Prediction processing may be a performed on a per CU basis or may be performed on a per sub-CU basis, the sub-CU being obtained by further splitting the CU. In a case that the CU and the sub-CU has an equal size, the number of sub-CUs in the CU is one. In a case that the CU has a size that is greater than the size of the sub-CU, the CU is split into sub-CUs. In a case that a CU has a size of 8×8 and a sub-CU has a size of 4×4, for example, the CU is split into two sub-CUs in the horizontal direction and two sub-CUs in the vertical direction, namely four sub-CUs.

There are two types of prediction (prediction modes), namely intra prediction and inter prediction. The intra prediction refers to prediction in an identical picture, and the inter prediction refers to prediction processing performed between different pictures (for example, between pictures at different display times, and between pictures of different layer images).

The transform and quantization processing is performed on a per CU basis, and the quantization transform coefficient may be entropy-coded on a per subblock basis with a size of 4×4.

Prediction Parameters

A prediction image is derived using prediction parameters that accompany a block. The prediction parameters include prediction parameters for intra prediction and for inter prediction.

Hereinafter, the prediction parameters for inter prediction will be described. The inter prediction parameters include prediction list utilization flags predFlagL0 and predFlagL1, reference picture indexes refIdxL0 and refIdxL1, and motion vectors mvL0 and mvL1. predFlagL0 and predFlagL1 are flags indicating whether or not a reference picture list (an L0 list and an L1 list) is to be used, and a corresponding reference picture list is used in a case that the value is 1. Note that in a case that the present specification mentions "a flag indicating whether or not XX", a flag being other than 0 (for example, 1) corresponds to a case where XX is true, and a flag being 0 corresponds to a case where XX is not true, and 1 is considered to be true while 0 is considered to be false in a logical negation, a logical product, and the like (the same applies to the following description). However, other values can be used as true values and false values in actual apparatuses and methods.

Examples of syntax elements for deriving inter prediction parameters include an affine flag affine_flag used in a merge mode, a merge flag merge_flag, a merge index merge_idx, an MMVD flag mmvd_flag, an inter prediction identifier inter_pred_idc for selecting a reference picture to be used in an AMVP mode, a reference picture index refIdxLX, a prediction vector index mvp_LX_idx for deriving a motion vector, a difference vector mvdLX, and a motion vector precision mode amvr_mode.

Reference Picture List

A reference picture list is a list including reference pictures stored in a reference picture memory 306. FIG. 6 is a conceptual diagram illustrating an example of reference pictures and a reference picture list. In the conceptual diagram illustrating an example of reference pictures in FIG. 6, the rectangles represent pictures, arrows represent reference relationships of the pictures, the horizontal axis represents a time, I, P, and B in the rectangles represent intra pictures, single-prediction pictures, and dual-prediction pictures, respectively, and the numbers in the rectangles represent decoding orders. As illustrated in the drawing, the decoding order of the pictures is I0, P1, B2, B3, and B4, and the display order is I0, B3, B2, B4, and P1. FIG. 6 illustrates an example of a reference picture list of a picture B3 (target picture). The reference picture list is a list to represent candidates of a reference picture, and one picture (slice) may have one or more reference picture lists. In the illustrated example, the target picture B3 has two reference picture lists, namely, an L0 list RefPicList0 and an L1 list RefPicList1. For the individual CUs, which of pictures in a reference picture list RefPicListX (X=0 or 1) is to be actually referred to is designated with refIdxLX. The drawing illustrates an example of refIdxL0=2 and refIdxL1=0. Note that LX is a description method used in a case that L0 prediction and L1 prediction are not distinguished, and in the following description, parameters for the L0 list and parameters for the L1 list are distinguished by replacing LX with L0 and L1.

Merge Prediction and AMVP Prediction

A method for decoding (coding) prediction parameters includes a merge prediction (merge) mode and an advanced motion vector prediction/adaptive motion vector prediction (AMVP) mode, and merge_flag is a flag for identifying these. The merge prediction mode is a mode of performing derivation from prediction parameters and the like of a nearby block on which processing has already been performed, without including the prediction list utilization flag predFlagLX, the reference picture index refIdxLX, and the motion vector mvLX in the coded data. The AMVP mode is a mode in which inter_pred_idc, refIdxLX, and mvLX are included in the coded data. Note that mvLX is coded as mvp_LX_idx for identifying a prediction vector mvpLX and a difference vector mvdLX. In addition to the merge prediction mode, there may be an affine prediction mode and an MMVD prediction mode.

inter_pred_idc is a value indicating the type and the number of reference pictures and is any of values PRED_L0, PRED_L1, and PRED_BI. PRED_L0 and PRED_L1 represent single prediction using one reference picture managed by the L0 list and the L1 list, respectively. PRED_BI represents dual prediction using two reference pictures managed by the L0 list and the L1 list.

merge_idx is an index indicating which of prediction parameters among prediction parameter candidates (merge candidates) derived from a block on which processing has been completed is to be used as a prediction parameter for the target block.

Motion Vector mvLX indicates the amount of shift between blocks on two different pictures. A prediction vector and a difference vector related to mvLX will be referred to as mvpLX and mvdLX, respectively.

Inter Prediction Indicator Inter_Pred_Idc and Prediction List Utilization Flag predFlagLX Relationships between inter_pred_idc, predFlagL0, and predFlagL1 are as follows, and inter_pred_idc, predFlagL0, and predFlagL1 can be transformed into each other.

inter_pred_idc=(predFlagL1<<1)+predFlagL0 predFlagL0=inter_pred_idc &1 predFlagL1=inter_pred_idc>>1

Note that a prediction list utilization flag may be used or an inter prediction identifier may be used as an inter prediction parameter. Also, determination using the prediction list utilization flag may be replaced with determination using the inter prediction identifier. On the contrary, determination using the inter prediction identifier may be replaced with determination using the prediction list utilization flag.
Determination of Dual Prediction biPred A flag biPred indicating whether dual prediction is to be performed can be derived based on whether both the two prediction list utilization flags are 1. For example, whether dual prediction is to be performed can be derived using the following expression.

biPred=(predFlagL0==1&& predFlagL1==1)

Alternatively, biPred can also be derived based on whether the inter prediction identifier is a value indicating that two prediction lists (reference pictures) are to be used. For example, biPred can be derived using the following expression.

biPred=(inter_pred_idc==PRED_BI)?1:0

Configuration of Video Decoding Apparatus

Figure 7:
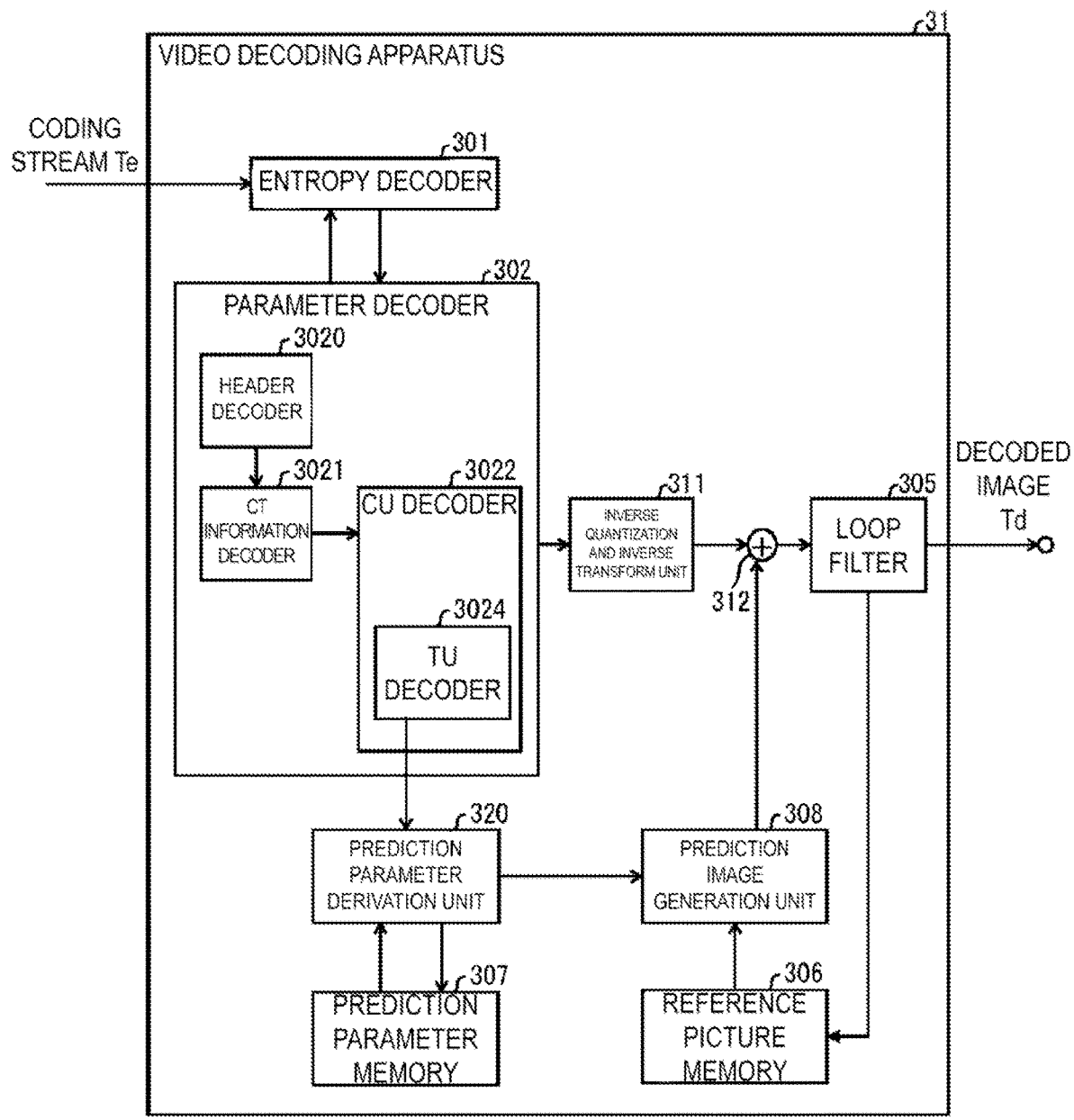
FIG. 7 is a schematic diagram illustrating a configuration of the video decoding apparatus.

A configuration of the video decoding apparatus 31 (FIG. 7) according to the present embodiment will be described.

The video decoding apparatus 31 is configured to include an entropy decoder 301, a parameter decoder (prediction image decoding apparatus) 302, a loop filter 305, a reference picture memory 306, a prediction parameter memory 307, a prediction image generation unit (prediction image generation apparatus) 308, an inverse quantization and inverse transform unit 311, an addition unit 312, and a prediction parameter derivation unit 320. Note that there is also a configuration in which the video decoding apparatus 31 does not include the loop filter 305 in accordance with the video coding apparatus 11, which will be described later.

The parameter decoder 302 further includes a header decoder 3020, a CT information decoder 3021, and a CU decoder 3022 (prediction mode decoder), and the CU decoder 3022 further includes a TU decoder 3024. These may be collectively referred to as decoding modules. The header decoder 3020 decodes parameter set information such as VPS, SPS, PPS, and APS and a slice header (slice information) from coded data. The CT information decoder 3021 decodes a CT from the coded data. The CU decoder 3022 decodes a CU from the coded data. The TU decoder 3024 decodes QP update information (quantization correction value) and a quantization prediction error (residual_coding) from the coded data in a case that a TU includes a prediction error.

The TU decoder 3024 decodes QP update information and a quantization prediction error from the coded data in cases other than a skip mode (skip_mode==0). More specifically, the TU decoder 3024 decodes a flag cu_cbp indicating whether or not a target block includes a quantization prediction error in the case of skip_mode==0 and decodes the quantization prediction error in a case that cu_cbp is 1. In a case that cu_cbp is not present in the coded data, the TU decoder 3024 derives 0.

The TU decoder 3024 decodes an index mts_idx indicating a transform basis form the coded data.

Also, the TU decoder 3024 decodes an index stIdx indicating utilization of secondary transform and a transform basis from the coded data. A case in which stIdx is 0 indicates that the secondary transform is not to be applied, a case in which stIdx is 1 indicates that one of a set (pair) of secondary transform basis is to be transformed, and a case in which stIdx is 2 indicates that the other one of the pair is to be transformed.

Also, the TU decoder 3024 may decode a subblock transform flag cu_sbt_flag. In a case that cu_sbt_flag is 1, a CU is split into a plurality of subblocks, and a residual of only one specific subblock is decoded. Further, the TU decoder 3024 may decode a flag cu_sbt_quad_flag indicating which of 4 and 2 the number of subblocks is, cu_sbt_horizontal_flag indicating a splitting direction, and cu_sbt_ pos_flag indicating a subblock including a transform coefficient that is not zero.

The prediction image generation unit 308 is configured to include an inter prediction image generation unit 309 and an intra prediction image generation unit 310.

The prediction parameter derivation unit 320 is configured to include an inter prediction parameter derivation unit 303 and an intra prediction parameter derivation unit 304.

Also, although an example in which a CTU and a CU are used as units of processing will be described below, the disclosure is not limited thereto, and the processing may be performed on a per sub-CU basis. Alternatively, the CTU and the CU may be replaced with a block, a sub-CU may be replaced with a subblock, and processing may be performed on a per block or subblock basis.

The entropy decoder 301 performs entropy decoding on a coding stream Te input from the outside and decodes individual codes (syntax elements). For the entropy coding, there are a scheme in which variable length coding is performed on syntax elements using a context (probability model) adaptively selected in accordance with types of syntax elements and a surrounding situation and a scheme in which variable length coding is performed on the syntax elements using a table or a calculation expression defined in advance. In the former context adaptive binary arithmetic coding (CABAC), a CABAC state of a context (a type (0 or 1) of a dominant symbol and a probability state index pStateIdx designating a probability) is stored in a memory. The entropy decoder 301 initializes all CABAC states at a head of a segment (a tile, a CTU row, or a slice). The entropy decoder 301 transforms the syntax elements into a binary string (Bin String) and decodes each bit of Bin String. In a case that a context is used, a context index ctxInc is derived from each bit of the syntax elements, the bit is decoded using the context, and the CABAC state of the used context is updated. Bits that do not use any context are decoded at an equal probability (EP, bypass), and derivation of ctxInc and CABAC states are omitted. The decoded syntax elements include prediction information for generating a prediction image, a prediction error for generating a difference image, and the like.

The entropy decoder 301 outputs the decoded codes to the parameter decoder 302. Examples of the decoded codes include a prediction mode predMod, merge_flag, merge_idx, inter_pred_idc, refIdxLX, mvp_LX_idx, mvdLX, and amvr_mode. Control regarding which of the codes is to be decoded is performed based on an instruction from the parameter decoder 302.

Basic Flow

Figure 8:
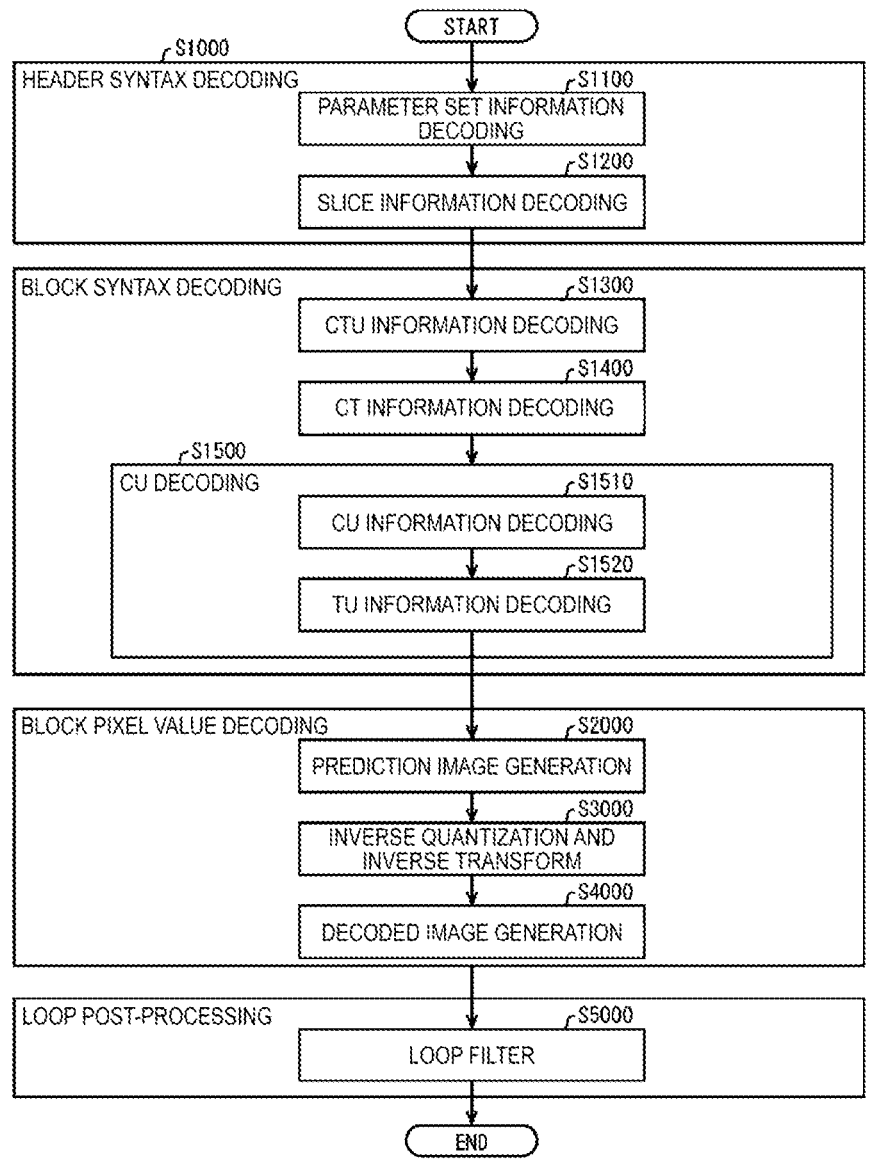
FIG. 8 is a flowchart for explaining schematic operations of the video decoding apparatus.

FIG. 8 is a flowchart for explaining schematic operations of the video decoding apparatus 31.

(S1100: Parameter Set Information Decoding) The header decoder 3020 decodes parameter set information such as VPS, SPS, and PPS from coded data.

(S1200: Slice Information Decoding) The header decoder 3020 decodes a slice header (slice information) from the coded data.

Hereinafter, the video decoding apparatus 31 derives a decoded image of each CTU by repeating processing in S1300 to S5000 on each CTU included in a target picture.

(S1300: CTU information decoding) The CT information decoder 3021 decodes the CTU from the coded data.

(S1400: CT information decoding) The CT information decoder 3021 decodes a CT from the coded data.

(S1500: CU decoding) The CU decoder 3022 performs S1510 and S1520 to decode a CU from the coded data.

(S1510: CU information decoding) The CU decoder 3022 decodes CU information, prediction information, a TU splitting flag split_transform_flag, a CU residual flag cbf_cb, cbf_cr, cbf_luma, and the like from the coded data.

(S1520: TU information decoding) The TU decoder 3024 decodes QP update information, a quantization prediction error, and a transform index mts_idx from the coded data in a case that a prediction error is included in the TU. Note that the QP update information is a difference value from a quantization parameter prediction value qPpred that is a prediction value of a quantization parameter QP.

(S2000: Prediction image generation) The prediction image generation unit 308 generates a prediction image for each block included in a target CU based on prediction information.

(S3000: Inverse quantization and inverse transform) The inverse quantization and inverse transform unit 311 executes inverse quantization and inverse transform processing on each TU included in the target CU.

(S4000: Decoded image generation) The addition unit 312 adds a prediction image supplied by the prediction image generation unit 308 and a prediction error supplied by the inverse quantization and inverse transform unit 311 to generate a decoded image of the target CU.

(S5000: Loop filter) The loop filter 305 applies loop filters such as a deblocking filter, SAO, and ALF to the decoded image to generate the decoded image.

Configuration of Inter Prediction Parameter Derivation Unit

Figure 12:
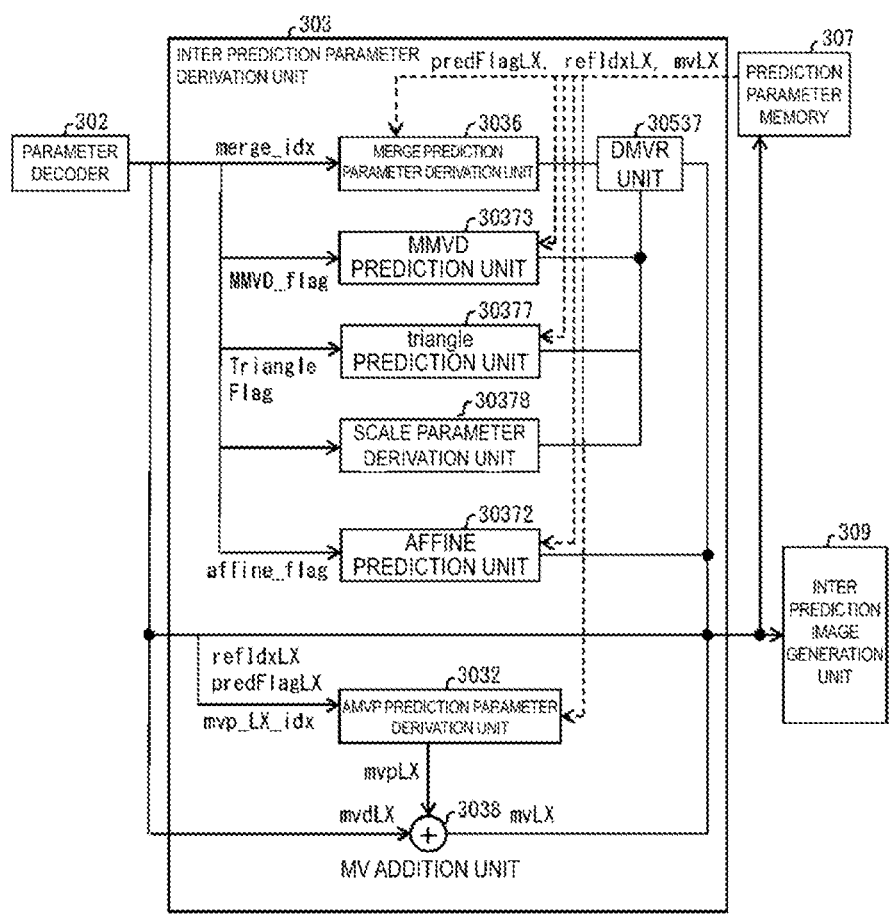
FIG. 12 is a schematic diagram illustrating a configuration of an inter prediction parameter derivation unit.

FIG. 12 is a schematic diagram illustrating a configuration of the inter prediction parameter derivation unit 303 according to the present embodiment. The inter prediction parameter derivation unit 303 derives inter prediction parameters with reference to prediction parameters stored in the prediction parameter memory 307 based on syntax elements input from the parameter decoder 302. Also, the inter prediction parameter derivation unit 303 outputs the inter prediction parameters to the inter prediction image generation unit 309 and the prediction parameter memory 307. Since the inter prediction parameter derivation unit 303 and internal elements thereof including an AMVP prediction parameter derivation unit 3032, a merge prediction parameter derivation unit 3036, an affine prediction unit 30372, an MMVD prediction unit 30373, a triangle prediction unit 30377, a DMVR unit 30537, and an MV addition unit 3038 are means that are common to the video coding apparatus and the video decoding apparatus, these may be collectively referred to as a motion vector derivation unit (motion vector derivation apparatus).

A scale parameter derivation unit 30378 derives a scaling ratio RefPicScale[i][j][0] of a reference picture in the horizontal direction, a scaling ratio RefPicScale[i][j][1] of the reference picture in the vertical direction, and RefPicIsScaled[i][j] indicating whether or not the reference picture has been scaled. Here, i indicates which of the L0 list and the L1 list the reference picture list is, and j is defined as a value indicating either the L0 reference picture list or the L1 reference picture list and is derived as follows.

RefPicScale[$i$][$j$][0]=((fRefWidth<<14)+(PicOutputWidthL>>1))/PicOutputWidthL

RefPicScale[$i$][$j$][1]=((fRefHeight<<14)+(PicOutputHeightL>>1))/PicOutputHeightL RefPicIsScaled[$i$][$j$]=(RefPicScale[$i$][$j$][0]!=(1<<14))||(RefPicScale[$i$][$j$][1]!=(1<<14))

Here, the variable PicOutputWidthL is a value used for calculating the scaling ratio in the horizontal direction in a case that the coded picture is referred to, and a value obtained by subtracting left and right offset values from the number of pixels of luminance of the coded picture in the horizontal direction is used. The variable PicOutputHeightL is a value used for calculating the scaling ratio in the vertical direction in a case that the coded picture is referred to, and a value obtained by subtracting upper and lower offset values from the number of pixels of luminance of the coded picture in the vertical direction is used. The variable fRefWidth is defined as the value of PicOutputWidthL of the reference picture of a reference list value j in the list i, and the variable fRefHight is defined as a value of PicOutputHeightL of the reference picture of the reference picture list value j in the list i.

In a case that affine_flag is 1, that is, affine_flag indicates an affine prediction mode, the affine prediction unit 30372 derives inter prediction parameters on a per subblock basis.

In a case that mmvd_flag is 1, that is, mmvd_flag indicates the MMVD prediction mode, the MMVD prediction unit 30373 derives inter prediction parameters from merge candidates and a difference vector derived by the merge prediction parameter derivation unit 3036.

In a case that TriangleFlag is 1, that is, TriangleFlag indicates the triangle prediction mode, the triangle prediction unit 30377 derives triangle prediction parameters.

In a case that merge_flag is 1, that is, merge_flag indicates the merge prediction mode, merge_idx is derived and output to the merge prediction parameter derivation unit 3036.

In a case that merge_flag is 0, that is, merge_flag indicates the AMVP prediction mode, the AMVP prediction parameter derivation unit 3032 derives mvpLX from inter_pred_idc, refIdxLX, or mvp_LX_idx.

MV Addition Unit

The MV addition unit 3038 adds derived mvpLX and mvdLX to derive mvLX.

Affine Prediction Unit

The affine prediction unit 30372 1) derives motion vectors at two control points CP0 and CP1 or three control points CP0, CP1, and CP2 of the target block, 2) derives affine prediction parameters of the target block, and 3) derives a motion vector of each subblock from the affine prediction parameters.

In the case of merge affine prediction, a motion vector cpMvLX[ ] at each of the control points CP0, CP1, and CP2 is derived from a motion vector of a block adjacent to the target block. In the case of inter affine prediction, cpMvLX [ ] at each control point is derived from a sum of a prediction vector at each of the control points CP0, CP1, and CP2 and a difference vector mvdCpLX[ ] derived from the coded data.

Figure 14:
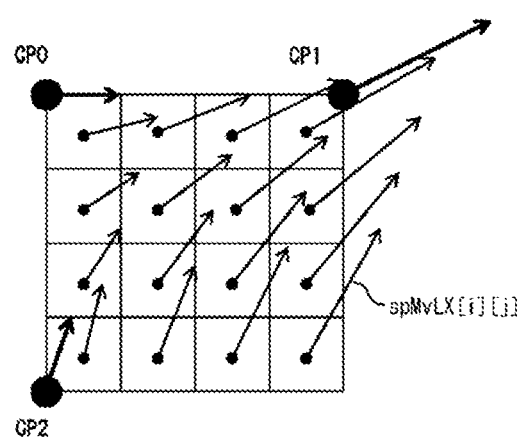
FIG. 14 is a diagram illustrating a motion vector spMvLX[xi][yi] for affine prediction.

FIG. 14 is a diagram illustrating an example in which a motion vector spMvLX of each subblock configuring a target block (bW*bH) is derived from a motion vector cpMvLX[0] at the control point CP0, a motion vector cpMvLX[1] at CP1, and a motion vector cpMvLX[2] at CP2. spMvLX is derived using a point (xPosCb, yPosCb) located at the center of each subblock as a motion vector as illustrated in the drawing.

The affine prediction unit 30372 derives affine prediction parameters (mvScaleHor, mvScalerVer, dHorX, dHorY, dHorX, and dVerY) of the target block from the motion vector at the control point.

mvScaleHor=cpMvLX[0][0]<<7 mvScaleVer=cpMvLX[0][1]<<7 dHorX=(cpMvLX[1][0]−cpMvLX[0][0])<<(7−log 2CbW)

dVerX=(cpMvLX[1][1]−cpMvLX[0][1])<<(7−log 2CbW)

In a case of numCpMv==3, dHorY=(cpMvLX[2][0]−cpMvLX[0][0])<<(7−log 2CbH)

dVerY=(cpMvLX[2][1]−cpMvLX[0][1])<<(7−log 2CbH)

In a case of numCpMv!=3, dHorY=−dVerX dVerY=dHorX

Here, log 2CbW and log 2CbH are logarithm values for the width bW and the height bH of the target block.

The affine prediction unit 30372 derives spMvLX[i][j] (i=0, 1, 2, . . . (bW/sbW)−1, j=0, 1, 2, . . . , (bH/sbH)−1) in the target block using the following expression based on the affine prediction parameters of the target block.

xPosCb=2+(i<<2)

yPosCb=2+(j<<2)

spMvLX[i][j][0]=mvScaleHor+dHorX*xPosCb+ dHorY*yPosCb spMvLX[i][j][1]=mvScaleVer+dVerX*xPosCb+ dVerY*yPosCb Further round shift and clipping may be performed.

spMvLX[i][j][0]=Clip3(−2^17,2^17,(spMvLX[i][j] [0]+64)>>7)

spMvLX[i][j][1]=Clip3(−2^17,2^17,(spMvLX[i][j] [1]+64)>>7)

Here, sbW and sbH are the width and height of the target subblock.

Further, spMvLX[i][j] is allocated to mvLX in a corresponding picture at the coordinates (xSb, ySb) of the left upper block of the subblock. Here, x=0 . . . sbW−1, y=0 . . . sbH−1.

mvLX[xSb+x][yXb+y]=spMv[i][j]

Merge Prediction

Figure 13:
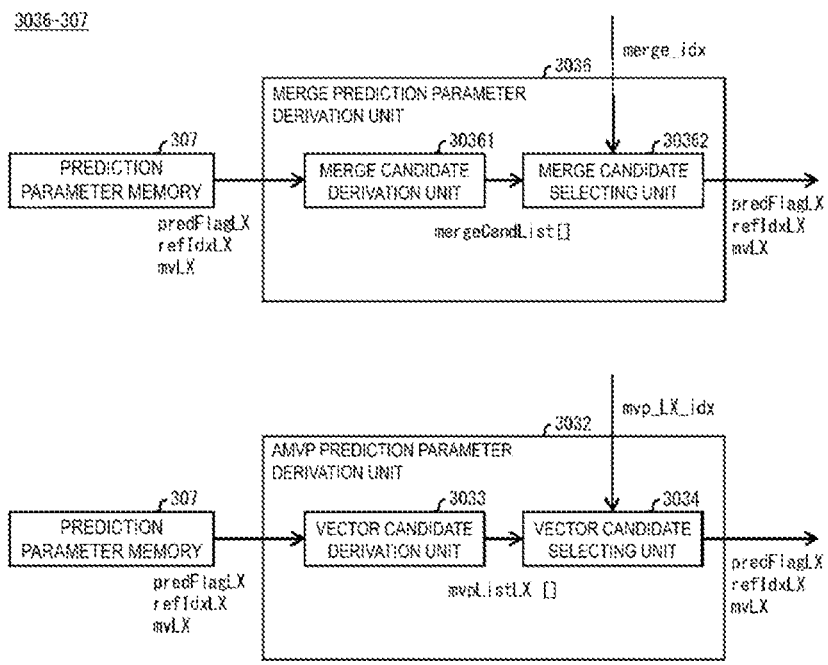
FIG. 13 is a schematic diagram illustrating configurations of a merge prediction parameter derivation unit and AMVP prediction parameter derivation unit.

FIG. 13 is a schematic diagram illustrating a configuration of the merge prediction parameter derivation unit 3036 according to the present embodiment. The merge prediction parameter derivation unit 3036 includes a merge candidate derivation unit 30361 and a merge candidate selecting unit 30362. Note that merge candidates are configured to include prediction parameters (predFlagLX, mvLX, and refIdxLX) and are stored in a merge candidate list. Indexes are allocated to the merge candidates stored in the merge candidate list in accordance with a predetermined rule.

The merge candidate derivation unit 30361 derives the merge candidates directly using a motion vector and refIdxLX of the adjacent block that has already been decoded. In addition, the merge candidate derivation unit 30361 may apply spatial merge candidate derivation processing, temporal merge candidate derivation processing, pair-wise merge candidate derivation processing, and zero merge candidate derivation processing, which will be described later.

As the spatial merge candidate derivation processing, the merge candidate derivation unit 30361 reads prediction parameters stored in the prediction parameter memory 307 and configures the prediction parameters as merge candidates in accordance with a predetermined rule. As a method for designating a reference picture, prediction parameters related to each of adjacent blocks within a range determined in advance from the target block (for example, all or a part of blocks that are adjacent to the left A1, the right B1, the upper right B0, the lower left A0, and the upper left B2 of the target block), for example, are designated. Each of the merge candidates will be referred to as A1, B1, B0, A0, and B2.

Here, each of A1, B1, B0, A0, and B2 is motion information derived from the blocks including the following coordinates. The positions of A1, B1, B0, A0, and B2 are indicated in the disposition of the merge candidates in the target picture in FIG. 9.

A1: (xCb−1, yCb+cbHeight−1)
B1: (xCb+cbWidth−1, yCb−1)
B0: (xCb+cbWidth, yCb−1)
A0: (xCb−1, yCb+cbHeight)
B2: (xCb−1, yCb−1)

The upper left coordinates of the target block are defined as (xCb, yCb), the width thereof is defined as cbWidth, and the height thereof is defined as cbHeight.

As temporal merge derivation processing, the merge candidate derivation unit 30361 reads, from the prediction parameter memory 307, prediction parameters of the lower right CBR of the target block or the block C in the reference image including the coordinates at the center, regards the prediction parameters as merge candidates Col, and stores the merge candidates Col in a merge candidate list mergeCandList[ ] as illustrated as the collocated picture in FIG. 9.

Typically, the block CBR is added to the mergeCandList [ ] with priority, and in a case that the CBR does not have a motion vector (for example, an intra prediction block), or in a case that the CBR is located outside a picture, the motion vector of the block C is added to the prediction vector candidates. Options of the prediction vector increase, and coding efficiency is enhanced, by adding, as prediction candidates, the motion vector of a collocated block with high probability of a different motion.

In a case that SliceTemporalMvpEnabledFlag is 0, or cbWidth*cbHeight is equal to or less than 32, the collocated motion vector mvLXCol of the target block is configured to 0, and an availability flag availableFlagLXCol of the collocated block is configured to 0.

Otherwise (SliceTemporalMvpEnabledFlag is 1), the following operations are performed.

For example, the merge candidate derivation unit 30361 may derive the position of C (xColCtr, yColCtr) and the position of CBR (xColCBr, yColCBr) by the following expressions.

$$xColCtr=xCb+(cbWidth>>1)$$

$$yColCtr=yCb+(cbHeight>>1)$$

$$xColCBr=xCb+cbWidth$$

$$yColCBr=yCb+cbHeight$$

In a case that CBR is available, the merge candidates COL are derived using the motion vector of CBR. In a case that CBR is not available, the merge candidates COL are derived using C. Then, availableFlagLXCol is configured to 1. Note that the reference picture may be collocated_ref_idx signaled in the slice header.

The pair-wise candidate derivation unit derives a pair-wise candidate avgK from an average of two merge candidates (p0Cand, p1Cand) that have already been stored in merge CandList and stores the pair-wise candidate avgK in the mergeCandList[ ].

$$mvLXavgK[0]=(mvLXp0Cand[0]+mvLXp1Cand[0])/2$$

$$mvLXavgK[1]=(mvLXp0Cand[1]+mvLXp1Cand[1])/2$$

The merge candidate derivation unit 30361 derives zero merge candidates Z0, . . . , ZM with refIdxLX of 0 . . . M and with both X and Y components of mvLX of 0 and stores the zero merge candidates Z0, . . . , ZM in the merge candidate list.

The order of the storage in mergeCandList[ ] is, for example, an order of spatial merge candidates (A1, B1, B0, A0, and B2), temporal merge candidates Col, the pair-wise candidate avgK, and the zero merge candidates ZK. Note that unavailable (intra prediction or the like for the blocks) reference blocks are not stored in the merge candidate list.
I=0
if (availableFlagA1)
    mergeCandList[i++]=A1
if (availableFlagB1)
    mergeCandList[i++]=B1
if (availableFlagB0)
    mergeCandList[i++]=B0
if (availableFlagA0)
    mergeCandList[i++]=A0
if (availableFlagB2)
    mergeCandList[i++]=B2
if (availableFlagCol)
    mergeCandList[i++]=Col
if (availableFlagAvgK)
    mergeCandList[i++]=avgK
if (i<MaxNumMergeCand)
    mergeCandList[i++]=ZK The merge candidate selecting unit 30362 selects merge candidates N indicated by merge_idx by the following expression from among the merge candidates included in the merge candidate list.
N=mergeCandList[merge_idx]

Here, N is a label indicating merge candidates and includes A1, B1, B0, A0, B2, Col, avgK, ZK, and the like. The motion information of the merge candidates indicated by the label N (mvLXN[0], mvLXN[0]) is indicated by predFlagLXN, and refIdxLXN.

Selected (mvLXN[0], mvLXN[0]), predFlagLXN, and refIdxLXN are selected as inter prediction parameters of the target block. The merge candidate selecting unit 30362 stores the inter prediction parameters of the selected merge candidates in the prediction parameter memory 307 and outputs the inter prediction parameters to the inter prediction image generation unit 309.

DMVR

Next, decoder side motion vector refinement (DMVR) processing performed by the DMVR unit 30375 will be described. In a case that merge_flag of a target CU is 1, or in a case that a skip flag skip_flag thereof is 1, the DMVR unit 30375 corrects mvLX of the target CU derived by the merge prediction unit 30374 using a reference image. Specifically, in a case that the prediction parameters derived by the merge prediction unit 30374 are for dual prediction, a motion vector is corrected using a prediction image that is derived from the motion vector in a case that it corresponds to two reference pictures. mvLX after the correction is supplied to the inter prediction image generation unit 309.

Also, in the derivation of a flag dmvrFlag that defines whether or not to perform DMVR processing, a plurality of conditions for configuring dmvrFlag to 1 includes a condition where the value of aforementioned RefPicIsScaled[0][refIdxL0] is 0 and the value of RefPicIsScaled[1][refIdxL1] is 0configuring. In a case that the value of dmvrFlag is configured to 1, the DMVR unit 30375 executes the DMVR processing.

Also, in the derivation of the flag dmvrFlag that defines whether or not to perform the DMVR processing, the plurality of conditions for configuring dmvrFlag to 1 includes a condition where ciip_flag is 0, that is, IntraInter combining processing is not appliedconfiguring.

In addition, in the derivation of the flag dmvrFlag that defines whether or not to perform the DMVR processing, the plurality of conditions for configuring dmvrFlag to 1 includes a condition where luma_weight_l0_flag[i] that is a flag indicating whether or not weight prediction coefficient information for L0 prediction of luminance, which will be described later, is present is 0 and the value of luma_weight_l1_flag[i] that is a flag indicating whether or not weight prediction coefficient information for L1 prediction of luminance is present is 0configuring. In a case that the value of dmvrFlag is configured to 1, the DMVR unit 30375 executes the DMVR processing.

Note that, in the derivation of the flag dmvrFlag that defines whether or not to perform the DMVR processing, the plurality of conditions for configuring dmvrFlag to 1 may include a condition where luma_weight_l0_flag[i] is 0, the value of luma_weight_l1_flag[i] is 0, chroma_weight_l0_flag[i] that is a flag indicating whether or not weight prediction coefficient information for L0 prediction of chrominance, which will be described later, is present is 0, and the value of chroma_weight_l1_flag[i] that is a flag indicating whether or not weight prediction coefficient information for L1 prediction of chrominance is present is 0configuring. In a case that the value of dmvrFlag is configured to 1, the DMVR unit 30375 executes the DMVR processing.

Prof

In a case that the value of RefPicIsScaled[0][refIdxLX] is 1, or in a case that the value of RefPicIsScaled[1][refIdxLX] is 1, then the value of cbProfFlagLX is configured to FALSE. Here, cbProfFlagLX is a flag that defines whether or not to perform prediction refinement (PROF) for affine prediction.

AMVP Prediction

FIG. 13 is a schematic diagram illustrating a configuration of the AMVP prediction parameter derivation unit 3032 according to the present embodiment. The AMVP prediction parameter derivation unit 3032 includes a vector candidate derivation unit 3033 and a vector candidate selecting unit 3034. The vector candidate derivation unit 3033 derives, based on refIdxLX, prediction vector candidates from motion vectors of adjacent blocks that have already been decoded and are stored in the prediction parameter memory 307 and stores the prediction vector candidates in a prediction vector candidate list mvpListLX[ ].

The vector candidate selecting unit 3034 selects, as mvpLX, a motion vector mvpListLX[mvp_LX_idx] indicated by mvp_LX_idx from among the prediction vector candidates in mvpListLX[ ]. The vector candidate selecting unit 3034 outputs selected mvpLX to the MV addition unit 3038.

MV Addition Unit

The MV addition unit 3038 adds mvpLX input from the AMVP prediction parameter derivation unit 3032 and decoded mvdLX to calculate mvLX. The addition unit 3038 outputs calculated mvLX to the inter prediction image generation unit 309 and the prediction parameter memory 307.

$$mvLX[0]=mvpLX[0]+mvdLX[0]$$

$$mvLX[1]=mvpLX[1]+mvdLX[1]$$

Detailed Categorization of Subblock Merge

Types of prediction processing to which subblock merge is related will be summarized. As described above, prediction processing is roughly categorized into merge prediction and AMVP prediction.

The merge prediction is further categorized as follows.
Normal merge prediction (block-based merge prediction)
Subblock merge prediction
The subblock merge prediction is further categorized as follows.
  Subblock prediction (ATMVP)
  Affine prediction
  Inferred affine prediction
  Constructed affine prediction
On the other hand, the AMVP prediction is categorized as follows.
  AMVP (translation)
  MVD affine prediction
The MVD affine prediction is further categorized as follows.
  4-parameter MVD affine prediction
  6-parameter MVD affine prediction Note that the MVD affine prediction refers to affine prediction decoding a difference vector and using the decoded difference vector.

In the subblock prediction, availability availableFlagSbCol of a collocated subblock COL of a target subblock is determined, and in a case that the collocated subblock COL is available, prediction parameters are derived, similarly to temporal merge derivation processing. At least, in a case that SliceTemporalMvpEnabledFlag described above is 0, availableFlagSbCol is configured to 0.

Merge with motion vector difference (MMVD) prediction may be categorized as merge prediction or may be categorized as AMVP prediction. In the former case, mmvd_flag and MMVD-related syntax elements are decoded in a case that merge_flag=1, and in the latter case, mmvd_flag and MMVD-related syntax elements are decoded in a case that merge_flag=0.

The loop filter 305 is a filter that removes block distortion or ringing distortion with a filter provided in the coding loop to improve image quality. The loop filter 305 applies a filter such as a deblocking filter, a Sample Adaptive Offset (SAO), and an Adaptive Loop Filter (ALF) on a decoded image of a CU generated by the addition unit 312.

The reference picture memory 306 stores the decoded image of the CU at a position determined in advance for each target picture and each target CU.

The prediction parameter memory 307 stores prediction parameters at a position determined in advance for each CTU or each CU. Specifically, the prediction parameter memory 307 stores parameters decoded by the parameter decoder 302, parameters derived by the prediction parameter derivation unit 320, and the like.

The parameters derived by the prediction parameter derivation unit 320 are input to the prediction image generation unit 308. In addition, the prediction image generation unit 308 reads a reference picture from the reference picture memory 306. The prediction image generation unit 308 generates a prediction image of a block or a subblock using the parameters and a reference picture (reference picture block) in a prediction mode indicated by predMode. Here, the reference picture block is a set of pixels (this is referred to as a block since the shape is typically a rectangle) on the reference picture and is a region to be referred to generate the prediction image.

Inter Prediction Image Generation Unit 309

In a case that predMode indicates an inter prediction mode, the inter prediction image generation unit 309 generates a prediction image of a block or a subblock through inter prediction using inter prediction parameters input from the inter prediction parameter derivation unit 303 and a reference picture.

Figure 15:
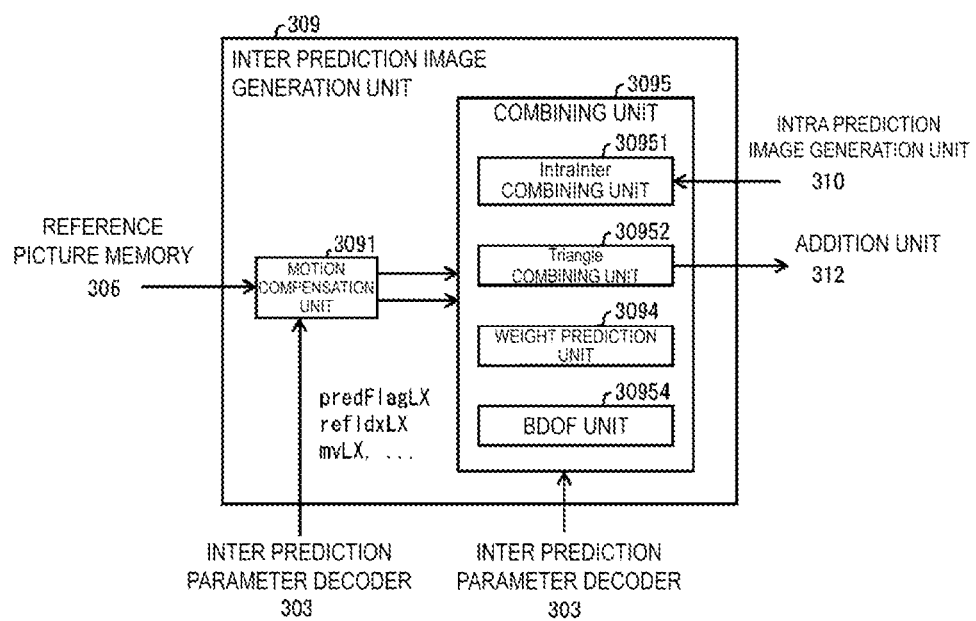
FIG. 15 is a schematic diagram illustrating a configuration of an inter prediction image generation unit.

FIG. 15 is a schematic diagram illustrating a configuration of the inter prediction image generation unit 309 included in the prediction image generation unit 308 according to the present embodiment. The inter prediction image generation unit 309 is configured to include a motion compensation unit (prediction image generation apparatus) 3091 and a combining unit 3095. The combining unit 3095 is configured to include an IntraInter combining unit 30951, a triangle combining unit 30952, a BDOF unit 30954, and a weight prediction unit 3094.

Motion Compensation

The motion compensation unit 3091 (interpolation image generation unit 3091) generates an interpolation image (motion compensation image) by reading a reference block from the reference picture memory 306 based on inter prediction parameters (predFlagLX, refIdxLX, and mvLX) input from the inter prediction parameter derivation unit 303. The reference block is a block at a position shifted by mvLX from the position of the target block on the reference picture RefPicLX designated with refIdxLX. Here, in a case that mvLX is not integer precision, a filter for generating a pixel at a decimal position that is called a motion compensation filter is applied to generate the interpolation image.

First, the motion compensation unit 3091 derives an integer position (xInt, yInt) and a phase (xFrac, yFrac) corresponding to coordinates (x, y) in the prediction block using the following expressions.

$$xInt=xPb+(mvLX[0]>>(\log 2(MVPREC)))+x$$

xFrac=mvLX[0]&(MVPREC−1)

yInt=yPb+(mvLX[1]>>(log 2(MVPREC)))+y yFrac=mvLX[1]&(MVPREC−1)

Here, (xPb, yPb) indicates the upper left coordinates of the block with a size of bW*bH, x=0, . . . , bw−1, y=0, . . . , bH−1, and MVPREC indicates precision (1/MVPREC pixel precision) of mvLX. For example, MVPREC=16.

The motion compensation unit 3091 derives a temporary image temp[ ][ ] by performing horizontal interpolation processing using the interpolation filter on the reference picture refImg. The following Σ is k=0 . . . . The sum shift1 related to k in NTAP−1 is a normalization parameter for adjusting a value range, and offset1=1<<(shift1−1).

temp[x][y]=(ΣmcFilter[xFrac][k]*refImg[xInt+k−NTAP/2+1][yInt]+offset1)>>shift1

Next, the motion compensation unit 3091 derives the interpolation image Pred[ ][ ] through vertical interpolation processing on the temporal image temp[ ][ ]. The following Σ is k=0 . . . . The sum shift2 related to k in NTAP−1 is a normalization parameter offset2=1<<(shift2−1) that adjusts a range of the value.

Pred[x][y]=(ΣmcFilter[yFrac][k]*temp[x][y+k−NTAP/2+1]+offset2)>>shift2

Note that in a case of dual prediction, Pred[ ][ ] described above is derived for each L0 list and each L1 list (referred to as interpolation images PredL0[ ][ ] and PredL1[ ][ ]) and an interpolation image Pred[ ][ ] is generated from PredL0 and PredL1[ ][ ].

Note that the motion compensation unit 3091 has a function of scaling the interpolation image in accordance with a scaling ratio RefPicScale[i][j][0] of the reference picture in the horizontal direction and a scaling ratio RefPicScale[i][j][1] of the reference picture in the vertical direction derived by the scale parameter derivation unit 30378.

The combining unit 3095 includes an IntraInter combining unit 30951, a triangle combining unit 30952, a weight prediction unit 3094, and a BDOF unit 30954.

Interpolation Filter Processing

Hereinafter, interpolation filter processing that is executed by the prediction image generation unit 308, which is interpolation filter processing in a case that the aforementioned resampling is applied and the size of the reference picture changes in a single sequence, will be described. Note that the processing may be executed by the motion compensation unit 3091, for example.

The prediction image generation unit 308 executes interpolation filter processing described below in a case that the value of RefPicIsScaled[i][j] input from the inter prediction parameter derivation unit 303 indicates that the reference picture has been scaled.

The prediction image generation unit 308 derives the value of a horizontal luminance interpolation filter coefficient fLH[p] and the value of a vertical luminance interpolation filter coefficient fLV[p] for correcting the size of the reference picture in terms of luminance. Here, the value p is a value corresponding to the position of the luminance sample at every 1/16 in the horizontal or vertical direction. The horizontal luminance interpolation filter coefficient fLH[p] of xFracL or yFracL at the 1/16 pixel position is derived as follows.

In a case that both the block sizes in the horizontal direction and the vertical direction are equal to 4 in affine prediction, FIG. 19 is used for the luminance interpolation filter coefficient fLH[p].

Otherwise, in a case that scalingRatio[0] is greater than 28672, FIG. 17 is used for the luminance interpolation filter coefficient fLH[p].

Otherwise, in a case that scaling Ratio[0] is greater than 20480, FIG. 18 is used for the luminance interpolation filter coefficient fLH[p].

Otherwise, the luminance interpolation filter coefficient fLH[p] is designated using FIG. 16 in accordance with hpelIfIdx.

The vertical luminance interpolation filter coefficient fLV [p] at each 1/16 fraction sample position p that is equal to yFracL is derived as follows.

In a case that both the block sizes in the horizontal direction and the vertical direction are equal to 4 in affine prediction, FIG. 19 is used for the luminance interpolation filter coefficient fLV[p].

Otherwise, in a case that scaling Ratio[1] is greater than 28672, FIG. 17 is used for the luminance interpolation filter coefficient fLV[p].

Otherwise, in a case that scalingRatio[1] is greater than 20480, FIG. 18 is used for the luminance interpolation filter coefficient fLV[p].

Otherwise, FIG. 16 is used for the luminance interpolation filter coefficient fLV[p] in accordance with hpelIfIdx.

It is assumed that the integer pixel position of luminance in a case that i=0 . . . 7 is (xInti, yInti), the pixel position of a decimal of luminance is (xFracL, yFracL), the reference pixel array of luminance is refPicLXL, and an index of a ½ pixel interpolation filter is hpelIfIdx, and the pixel value predSampleLXL of the interpolation image of luminance is derived as follows.

In a case that both xFracL and yFracL are equal to 0, and both scalingRatio[0] and scalingRatio[1] are smaller than 20481, the value of predSampleLXL is derived as follows. Hereinafter, E represents a sum related to i=0 . . . 7.

predSampleLXL=refPicLXL[xInt3][yInt3]<<shift3

Otherwise, in a case that yFracL is 0 and scalingRatio[1] is smaller than 20481, the value of predSampleLXL is derived as follows.

predSampleLXL=(ΣfLH[xFracL][i]*refPicLXL[xInti][yInt3])>>shift1

Otherwise, in a case that xFracL is 0, and scalingRatio[0] is smaller than 20481, the value of predSampleLXL is derived as follows.

predSampleLXL=(ΣfLV[yFracL][i]*refPicLXL[xInt3][yInti])>>shift1

Otherwise, the value of predSampleLXL is derived as follows.

The pixel array temp[n] of n=0 . . . 7 is derived as follows.

temp[n]=(ΣfLH[xFracL][i]*refPicLXL[xInti][yIntn])>>shift1

The pixel value predSampleLXL of the interpolation image of luminance is derived as follows.

predSampleLXL=(ΣfLV[yFracL][i]*temp[i])>>shift2

In addition, the prediction image generation unit 308 derives the value of a horizontal chrominance interpolation filter coefficient fCH[p] and the value of a vertical chrominance interpolation filter coefficient fCV[p] for correcting the size of the reference picture in terms of chrominance.

The value p referred here is a value corresponding to a position of the chrominance sample at every 1/32 in the horizontal or vertical direction. The horizontal chrominance interpolation filter coefficient fCH[p] of xFracC at the 1/32 pixel position p is derived as follows.

In a case that scalingRatio[0] is greater than 28672, FIG. 22 is used for the chrominance interpolation filter coefficient fCH[p].

Otherwise, in a case that scalingRatio[0] is greater than 20480, FIG. 21 is used for the chrominance interpolation filter coefficient fCH[p].

Otherwise, FIG. 20 is used for the chrominance interpolation filter coefficient fCH[p].

The vertical chrominance interpolation filter coefficient fCV[p] at each 1/32 decimal pixel position p that is equal to yFracC is derived as follows.

In a case that scalingRatio[1] is greater than 28672, FIG. 22 is used for the chrominance interpolation filter coefficient fCV[p].

Otherwise, in a case that scalingRatio[1] is greater than 20480, FIG. 21 is used for the chrominance interpolation filter coefficient fCV[p].

Otherwise, FIG. 20 is used for the chrominance interpolation filter coefficient fCV[p].

It is assumed that the integer pixel position of chrominance in a case that i=0 . . . 3 is (xInti, yInti), the pixel position of the decimal of chrominance is (xFracL, yFracL), and the reference pixel array of chrominance is refPicLXL, and the pixel value predSampleLXLC of the interpolation image of chrominance is derived as follows.

The pixel value predSampleLXC of the interpolation image of chrominance is derived as follows.

In a case that both xFracC and yFracC are 0, and both scalingRatio[0] and scalingRatio[1] are smaller than 20481, the value of predSampleLXC is derived as follows. Hereinafter, Σ denotes a sum of i=0 . . . 3.

predSampleLXC=refPicLXC[xInt1][yInt1]<<shift3

Otherwise, in a case that yFracC is 0 and scalingRatio[1] is smaller than 20481, the value of predSampleLXC is derived as follows.

predSampleLXC=(ΣfCH[xFracC][i]*refPicLXC
[xInti][yInt1])>>shift1

Otherwise, in a case that xFracC is 0, and scalingRatio[0] is smaller than 20481, the value of predSampleLXC is derived as follows.

predSampleLXC=(ΣfCV[yFracC][i]*refPicLXC
[xInt1][yInti])>>shift1

Otherwise, the value of predSampleLXC is derived as follows.

The pixel array temp[n] of n=0 . . . 3 is derived as follows.

temp[n]=(ΣfCH[xFracC][i]*refPicLXC[xInti]
[yIntn])>>shift1

The pixel value predSampleLXC of the interpolation image of chrominance is derived as follows.

predSampleLXC=(fCV[yFracC][0]*temp[0]+fCV
[yFracC][1]*temp[1]+fCV[yFracC][2]*temp[2]+
fCV[yFracC][3]*temp[3])>>shift2

IntraInter Combining processing

The IntraInter combining unit 30951 generates a prediction image from a weighted sum of an inter prediction image and an intra prediction image.

The pixel value predSamplesComb[x][y] of the prediction image is derived as follows in a case that a flag ciip_flag indicating whether to apply IntraInter combining processing is 1.

predSamplesComb[x][y]=(w*predSamplesIntra[x][y]+
(4−w)*predSamplesInter[x][y]+2)>>2

Here, predSamplesIntra[x][y] is an intra prediction image and is limited to planar prediction. predSamplesInter[x][y] is a reconstructed inter prediction image.

A weight w is derived as follows.

In a case that both the lowermost block (A1 in FIG. 9) that is adjacent to the target coding block from the left side and the rightmost block (B1 in FIG. 9) that is adjacent thereto from the side above correspond to intra prediction, w is configured to 3.

Otherwise, in a case that both the lowermost block that is adjacent to the target coding block from the left side and the rightmost block that is adjacent thereto from the side above do not correspond to intra prediction, w is configured to 1.

Otherwise, w is configured to 2.

Triangle Combining Processing

The triangle combining unit 30952 generates a prediction image using the aforementioned triangle prediction.

BDOF Prediction

Next, details of BDOF prediction (bi-directional optical flow, BDOF processing) performed by the BDOF unit 30954 will be described. The BDOF unit 30954 generates a prediction image with reference to two prediction images (a first prediction image and a second prediction image) and a gradient correction item in a dual prediction mode.

Figure 26:
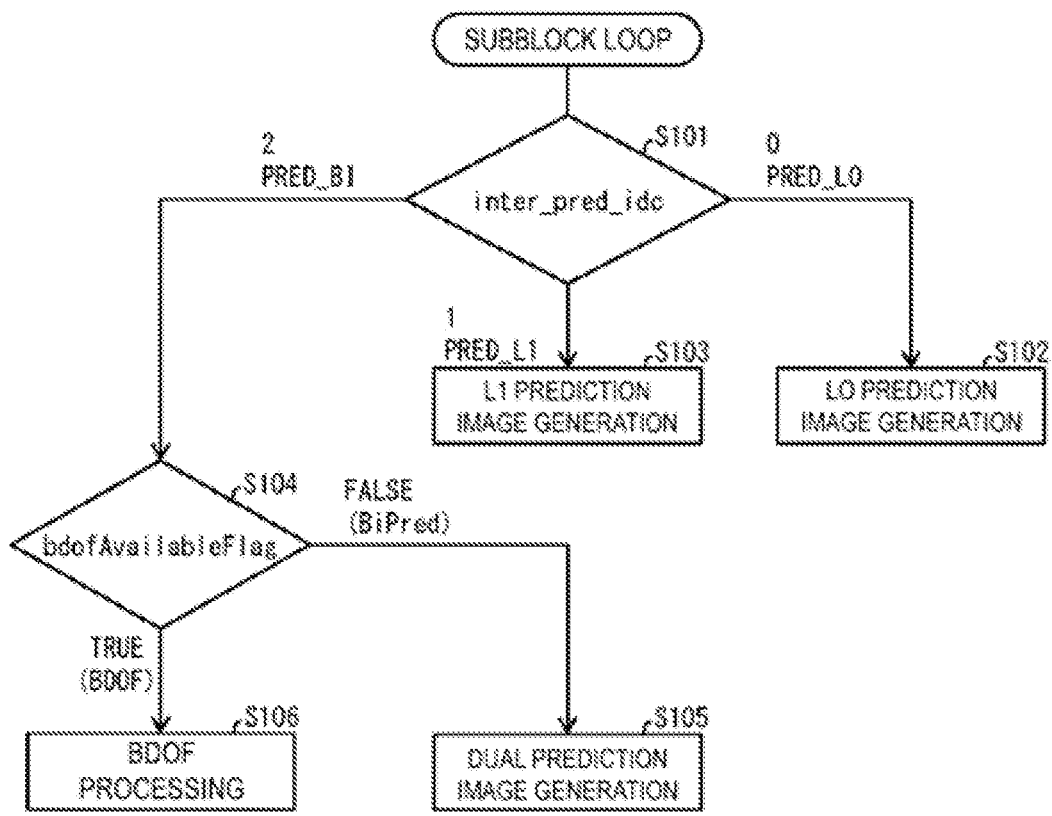
FIG. 26 is a flowchart for explaining a flow of processing in which a BDOF unit derives a prediction image.

FIG. 26 is a flowchart for explaining a flow of processing of deriving a prediction image.

In a case that the inter prediction parameter decoder 303 makes a determination of single prediction of L0 (inter_pred_idc is 0 in S101), the motion compensation unit 3091 generates PredL0[x][y] (S102). In a case that the inter prediction parameter decoder 303 makes a determination of single prediction of L1 (inter_pred_idc is 1 in S101), the motion compensation unit 3091 generates PredL1[x][y] (S103). On the other hand, in a case that the inter prediction parameter decoder 303 makes a determination of a dual prediction mode (inter_pred_idc is 2 in S101), the processing continues to the processing in S104 below. In S104, the combining unit 3095 determines a necessity of BDOF processing with reference to bdofAvailableFlag indicating whether or not to perform BDOF processing. The BDOF unit 30954 executes BDOF processing to generate a dual prediction image (S106) in a case that bdofAvailableFlag indicates TRUE, or the combining unit 3095 generates a prediction image through typical dual prediction image generation (S105) in a case that bdofAvailableFlag indicates FALSE.

In the derivation of the flag bdofAvailableFlag that defines whether or not to perform the BDOF processing, a plurality of conditions for configuring bdofAvailableFlag to 1 include a condition where the value of RefPicIsScaled[0][refIdxL0] described above is 0 and the value of RefPicIsScaled[1][refIdxL1] is 0configuring.

Also, in the derivation of the flag bdofAvailableFlag that defines whether or not to perform the BDOF processing, the plurality of conditions for configuring bdofAvailableFlag to 1 include a condition where ciip_flag is 0, that is, the IntraInter combining processing is not to be appliedconfiguring.

In the derivation of the flag bdofAvailableFlag that defines whether or not to perform the BDOF processing, the plurality of conditions for configuring bdofAvailableFlag to 1 includes a condition where luma_weight_l0_flag[i] that is a flag indicating whether or not weight prediction coefficient information for L0 prediction of luminance, which will be described later, is present is 0 and the value of luma_weight_l1_flag[i] that is a flag indicating whether or not weight prediction coefficient information for L1 prediction of luminance is present is 0configuring.

Note that, in the derivation of the flag bdofAvailableFlag that defines whether or not to perform the BDOF processing, the plurality of conditions for configuring bdofAvailableFlag to 1 may include a condition where luma_weight_l0_flag[i] is 0, the value of luma_weight_l1_flag[i] is 0, chroma_weight_l0_flag[i] that is a flag indicating whether or not weight prediction coefficient information for L0 prediction of chrominance, which will be described later, is present is 0, and the value of chroma_weight_l1_flag[i] that is a flag indicating whether or not weight prediction coefficient information for L1 prediction of chrominance is present is 0.

Figure 27:
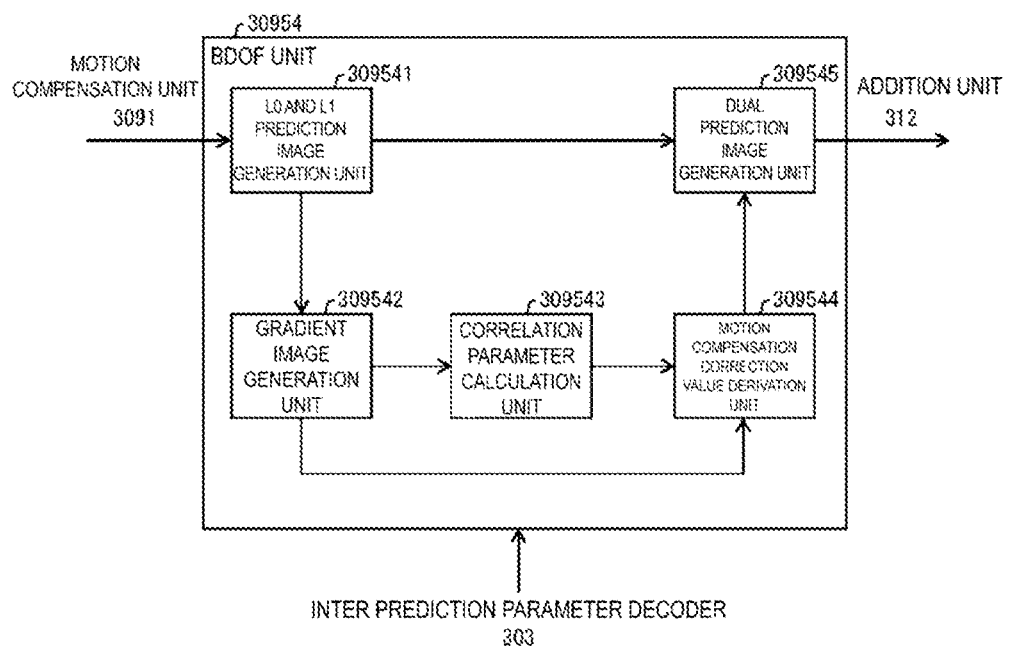
FIG. 27 is a schematic diagram illustrating a configuration of the BDOF unit.

Referring to FIG. 27, details of specific processing performed by the BDOF unit 30954 will be described. The BDOF unit 30954 includes an L0 and L1 prediction image generation unit 309541, a gradient image generation unit 309542, a correlation parameter calculation unit 309543, a motion compensation correction value derivation unit 309544, and a dual prediction image generation unit 309545. The BDOF unit 30954 generates a prediction image from an interpolation image received from the motion compensation unit 3091 and an inter prediction parameter received from the inter prediction parameter decoder 303 and outputs the prediction image to the addition unit 312. Note that the processing of deriving the motion compensation correction value bdofOffset (motion compensation correction image) from the gradient image, correcting PredL0 and PredL1, and then deriving an image will be referred to as bidirectional gradient change processing.

The L0 and L1 prediction image generation unit 309541 generates prediction interpolation images predSamplesL0 and predSamplesL1 for L0 an L1 prediction used in the BDOF processing.

Note that the variable shift1 is configured to 6, the variable shift2 is configured to 4, the variable shift3 is configured to 1, the variable shift4 is configured to Max (3, 15−BitDepth), the variable offset4 is configured to 1<<(shift4−1), and the variable mvRefineThres is configured to 1<<4. predSamplesL0 is an interpolation image of L0 prediction, and predSamplesL1 is an interpolation image of L1 prediction.

In a case that bdofAvailableFlag is FALSE, the dual prediction image generation unit 309545 derives the pixel value of the prediction image on a per 4×4 pixel block basis follows.

pbSamples[$x$][$y$]=Clip3(0,(1<<BitDepth)−1,(predSamplesL0[$x$+1][$y$+1]+offset4+predSamplesL1[$x$+1][$y$+1])>>shift4)

Otherwise (bdofAvailableFlag is equal to TRUE), the pixel value of the current prediction image is derived as follows.

The position (hx, vy) of the corresponding pixel position (x, y) in the prediction image array is derived as follows.

hx=Clip3(1,$W$,x)

vy=Clip3(1,$H$,y)

Here, W is the number of pixels of the processing block in the horizontal direction, and H is the number of pixels thereof in the vertical direction.

The gradient image generation unit 309542 generates gradient images. Specifically, variables gradientHL0[x][y], gradientVL0[x][y], gradientHL1[Xl][Y], and gradientVL1[x][y] of gradient images are derived as follows. gradientHL0 and gradientHL1 represent gradient images in the horizontal direction, and gradientVL0 and graientVL1 represent gradient images in the vertical direction.

gradientHL0[$x$][$y$]=(predSamplesL0[$hx$+1][$vy$]>>shift1)−(predSampleL0[$hx$−1][$vy$])>>shift1)

gradientVL0[$x$][$y$]=(predSampleL0[$hx$][$vy$+1]>>shift1)−(predSampleL0[$hx$][$vy$−1])>>shift1)

gradientHL1[$x$][$y$]=(predSamplesL1[$hx$+1][$vy$]>>shift1)−(predSampleL1[$hx$−1][$vy$])>>shift1)

gradientVL1[$x$][$y$]=(predSampleL1[$hx$][$vy$+1]>>shift1)−(predSampleL1[$hx$][$vy$−1])>>shift1)

Also, variables diff[x][y], tempH[x][y], and tempV[x][y] are derived.

diff[$x$][$y$]=(predSamplesL0[$hx$][$vy$]>>shift2)−(predSamplesL1[$hx$][$vy$]>>shift2)

temp$H$[$x$][$y$]=(gradientHL0[$x$][$y$]+gradientHL1[$x$][$y$])>>shift3 temp$V$[$x$][$y$]=(gradientVL0[$x$][$y$]+gradientVL1[$x$][$y$])>>shift3

Next, the correlation parameter calculation unit 309543 derives gradient product-sum variables sGx2, sGy2, sGxGy, sGxdI, and sGydI for each block of 4×4 pixels as follows.

sGx2=ΣΣabs(temp$H$[$x$Sb+$i$][$y$Sb+$j$])

sGy2=ΣΣabs(temp$V$[$x$Sb+$i$][$y$Sb+$j$])

sGxGy=ΣΣ(Sign(temp$V$[$x$Sb+$i$][$y$Sb+$j$])*temp$H$[$x$Sb+$i$][$y$Sb+$j$])

sGxdI=ΣΣ(−Sign(temp$H$[$x$Sb+$i$][$y$Sb+$j$])+diff[$x$Sb+$i$][$y$Sb+$j$])

sGydI=ΣΣ(−Sign(temp$V$[$x$Sb+$i$][$y$Sb+$j$])*diff[$x$Sb+$i$][$y$Sb+$j$])

Here, ΣΣ means that a total value of a block of 6×6 pixels including one pixel around 4×4 pixels where i=−1 . . . 4, j=−1 . . . 4 is obtained, abs(x) is a function that returns an absolute value of x, and Sign(x) is a function that returns 1 in a case that the value of x is greater than 0, returns 0 in a case that the value of x is 0, and returns −1 in a case that the value of x is smaller than 0.

Next, the motion compensation correction value derivation unit 309544 derives a correction weight vector (u, v) on a per 4×4 pixel basis using the derived gradient product-sums sGx2, sGy2, sGxGy, sGxdI, and sGydI.

$u$=sGx2>0?Clip3(−mvRefineThres+1,mvRefineThres−1,(sGxdI<<2)>>Floor(Log 2(sGx2))):0

$v$=sGy2>0?Clip3(−mvRefineThres+1,mvRefineThres−1,((sGydI<<2)−((υx*sGxGy)>>1))>>Floor(Log 2(sGy2))):0

The motion compensation correction value derivation unit 309544 derives bdofOffset using a correction weight vector (u, v) on a per 4×4 pixel basis and gradient images gradientHL0, gradientVL0, gradientHL1, and gradientVL1.

bdofOffset=$u$*(gradientHL0[$x$+1][$y$+1]−gradientHL1[$x$+1][$y$+1])+$v$*(gradientVL0[$x$+1][$y$+1]−gradientVL1[$x$+1][$y$+1])

The dual prediction image generation unit 309545 derives a pixel value Pred of a prediction image of 4×4 pixels by the following equation using the aforementioned parameters.

pbSamples[x][y]=Clip3(0,(1<<BitDepth)−1,(predSamplesL0[x+1][y+1]+offset4+predSamplesL1[x+1][y+1]+bdofOffset)>>shift4)

Weight Prediction

The weight prediction unit 3094 generates a prediction image pbSamples of a block from an interpolation image PredLX. First, syntax related to the weight prediction unit 3094 will be described.

FIG. 28A illustrates an example of syntax of sps_weighted_pred_flag and sps_weighted_bipred_flag in a case of a sequence parameter set (SPS).

The fact that sps_weighted_pred_flag is equal to 1 indicates that there is a probability that weight prediction is to be applied to a P slice that refers to the SPS. The fact that sps_weighted_pred_flag is equal to 0 indicates that weight prediction is not to be applied to the P slice that refers to the SPS. The fact that sps_weighted_bipred_flag is equal to 1 indicates that there is a probability that weight prediction is to be applied to a B slice that refers to the SPS. The fact that sps_weighted_bipred_flag is equal to 0 indicates that weight prediction is not to be applied to the B slice that refers to the SPS.

FIG. 28B illustrates an example of syntax of pps_weighted_pred_flag and pps_weighted_bipred_flag in a case of a picture parameter set (PPS).

The fact that pps_weighted_pred_flag is equal to 0 indicates that weight prediction is not to be applied to a P slice that refers to the PPS. The fact that pps_weighted_pred_flag is equal to 1 indicates that weight prediction is to be applied to the P slice that refers to the PPS. In a case that sps_weighted_pred_flag is equal to 0, the weight prediction unit 3094 configures the value of pps_weighted_pred_flag to 0. In a case that pps_weighted_pred_flag is not present, the value is configured to 0.

The fact that pps_weighted_bipred_flag is equal to 0 indicates that weight prediction is not to be applied to a B slice that refers to the PPS. The fact that pps_weighted_bipred_flag is equal to 1 indicates that weight prediction is to be applied to the B slice that refers to the PPS. In a case that the sps_weighted_bipred_flag is equal to 0, the weight prediction unit 3094 configures the value of pps-weighted_bipred_flag to 0. In a case that pps_weighted_bipred_flag is not present, the value is configured to 0.

FIG. 29 illustrates Weighted prediction parameters syntax ( ) in "Versatile Video Coding (Draft 7)," JVET-P2001-vE, Joint Video Exploration Team (JVET) of ITU-T SG 16 WP 3 and ISO/IEC JTC 1/SC 29/WG 11, 2019-11-14 that is called with the slice header.

Here, luma_log 2_weight_denom is a logarithm of 2 that is a bottom of denominators of all luminance weight coefficients. The value of luma_log 2_weight_denom has to fall within a range of 0 to 7. delta_chroma_log 2_weight_denom is a difference of logarithms that has, as a bottom, 2 that is denominators of all chrominance weight coefficients. In a case that delta_chroma_log 2_weight_denom is not present, the value is estimated to be equal to 0. A variable ChromaLog 2WeightDenom is derived to be equal to luma_log 2_weight_denom+delta_chroma_log 2_weight_denom, and the value has to fall within a range of 0 to 7.

A case in which luma_weight_l0_flag[i] is 1 indicates that a weight coefficient of a luminance component for L0 prediction is present. A case in which luma_weight_l0_flag [i] is 0 indicates that a weight coefficient of the luminance component for L0 prediction is not present. In the case in which luma_weight_l0_flag[i] is not present, the weight prediction unit 3094 estimates that the value is equal to 0. A case in which chroma_weight_l0_flag[i] is 1 indicates that a weight coefficient of a chrominance prediction value for L0 prediction is present. A case in which chroma_weight_l0_flag[i] is 0 indicates that a weight coefficient of the chrominance prediction value for L0 prediction is not present. In the case in which chroma_weight_l0_flag [i] is not present, the weight prediction unit 3094 estimates that the value is equal to 0.

delta_luma_weight_l0[i] is a difference of weight coefficients applied to the luminance prediction value for L0 prediction using RefPicList[0][i]. A variable LumaWeightL0 [i] is derived to be equal to (1<<luma_log 2_weight_denom)+delta_luma_weight_l0[i]. In a case that luma_weight_l0_flag[i] is equal to 1, the value of delta_luma_weight_l0[i] has to fall within the range from −128 to 127. In a case that luma_weight_l0_flag[i] is equal to 0, the weight prediction unit 3094 estimates that LumaWeightL0[i] is equal to an exponentiation (2^luma_log 2_weight_denom) of luma_log 2_weight_denom of 2.

luma_offset_l0[i] is an addition offset that is applied to a luminance prediction value for the L0 prediction that has used RefPicList[0][i]. The value of luma_offset_l0[i] has to fall within a range of −128 to 127. In a case that luma_weight_l0_flag[i] is equal to 0, the weight prediction unit 3094 estimates that luma_offset_l0[i] is equal to 0.

delta_chroma_weight_l0[i][j] is a difference of weight coefficients applied to a chrominance prediction value for the L0 prediction that has used RefPicList0[i] in which j is 0 for Cb and j is 1 for Cr. A variable ChromaWeightL0[i][j] is derived to be equal to (1<<ChromaLog 2WeightDenom)+delta_chroma_weight_l0[i][j]. In a case that chroma_weight_l0_flag[i] is equal to 1, the value of delta_chroma_weight_l0[i][j] has to fall within a range of −128 to 127. In a case that chroma_weight_l0_flag[i] is 0, the weight prediction unit 3094 estimates that ChromaWeightL0 [i][j] is equal to an exponentiation (2^ChromaLog 2WeightDenom) of ChromaLog 2WeightDenom of 2. delta_chroma_offset_l0[i][j] is a difference of addition offsets applied to a chrominance prediction value for the L0 prediction that has used RefPicList0[i] in which j is 0 for Cb and j is 1 for Cr. A variable ChromaOffsetL0[i][j] is derived as follows.

ChromaOffsetL0[i][j]=Clip3(−128,127,(128+delta_chroma_offset_l0[i][j]−((128*ChromaWeightL0[i][j])>>ChromaLog2WeightDenom)))

The value of delta_chroma_offset_l0[i][j] has to fall within a range of −4*128 to 4*127. In a case that chroma_weight_l0_flag[i] is equal to 0, the weight prediction unit 3094 estimates that ChromaOffsetl0[i][j] is equal to 0.

Note that luma_weight_l1_flag[i], chroma_weight_l1_flag[i], delta_luma_weight_l1[i], luma_offset_l1[i], delta_chroma_weight_l1[i][j], and delta_chroma_offset_l1[i][j] are replaced with and interpreted as luma_weight_l0_flag[i], chroma_weight_l0_flag[i], delta_luma_weight_l0[i], luma_offset_l0[i], delta_chroma_weight_l0[i][j], and delta_chroma_offset_l0[i][j] respectively, and l0, L0, list0, and List0 are replaced with and interpreted as l1, L1, list 1, and List 1.

Hereinafter, processing performed by the inter prediction parameter derivation unit 303 will be described.

In "Versatile Video Coding (Draft 7)," JVET_P2001-vE, Joint Video Exploration Team (JVET) of ITU-T SG 16 WP 3 and ISO/IEC JTC 1/SC 29/WG 11, 2019-11-14, the variable weightedPredFlag indicating whether or not to perform weight prediction processing is derived as follows.

In a case that slice_type is equal to P, weightedPredFlag is configured to be equal to pps_weighted_pred_flag defined by the PPS.

Otherwise, in a case that slice_type is equal to B, weightedPredFlag is configured to be equal to pps_weighted_bi-pred_flag&&(!dmvrFlag) defined by the PPS.

Hereinafter, bcw_idx is a weight index for dual prediction with a weight on a per CU basis. In a case that bcw_idx is not signaled, bcw_idx=0 is configured. For bcwIdx, bvwIdxN of a nearby block is configured in the merge prediction mode, and bcw_idx of a target block is configured in the AMVP prediction mode.

In a case that the value of the variable weightedPredFlag is equal to 0, or in a case that the value of the variable bcwIdx is 0, a prediction image pbSamples is derived as follows in typical prediction image processing.

In a case that one of prediction list utilization flags (predFlagL0 or predFlagL1) is 1 (single prediction) (weight prediction is not to be used), processing of the following expression for matching PredLX (LX is L0 or L1) with the pixel bit number bitDepth is performed.

pbSamples[$x$][$y$]=Clip3(0,(1<<bitDepth)−1,(PredLX[$x$][$y$]+offset1)>>shift1)

Here, shift1=14−bitDepth, offset1=1<<(shift1−1). PredLX is an interpolation image of L0 or L1 prediction.

Also, in a case that both the prediction list utilization flags (predFlagL0 and predFlagL1) are 1 (dual prediction PRED_BI) and weight prediction is not to be used, processing of the following expression for averaging PredL0 and PredL1 to match the value with the pixel bit number is performed.

pbSamples[$x$][$y$]=Clip3(0,(1<<bitDepth)−1,(PredL0[$x$][$y$]+PredL1[$x$][$y$]+offset2)>>shift2)

Here, shift2=15−bitDepth, offset2=1<<(shift2−1).

In a case that the value of the variable weightedPredFlag is equal to 1 and the value of the variable bcwIdx is equal to 0, the prediction image pbSamples is derived as follows in weight prediction processing.

The variable shift1 is configured to be equal to Max(2, 14−bitDepth). The variables log 2Wd, o0, o1, w0, and w1 are derived as follows.

In a case that cIdx is 0 and corresponds to luminance, then the following operations are applied.

log 2Wd=luma_log 2_weight_denom+shift1

$w$0=LumaWeightL0[refIdxL0]

$w$1=LumaWeightL1[refIdxL1]

$o$0=luma_offset_$l$0[refIdxL0]<<(bitDepth−8)

$o$1=luma_offset_$l$1[refIdxL1]<<(bitDepth−8)

Otherwise, (chrominance in a case that cIdx is not equal to 0), the following operations are applied.

log 2Wd=ChromaLog 2WeightDenom+shift1

$w$0=ChromaWeightL0[refIdxL0][cIdx−1]

$w$1=ChromaWeightL1[refIdxL1][cIdx−1]

$o$0=ChromaOffsetL0[refIdxL0][cIdx−1]<<(bitDepth−8)

$o$1=ChromaOffsetL1[refIdxL1][cIdx−1]<<(bitDepth−8)

x=0 . . . nCbW−1 and y=0 . . . . The pixel value pbSamples[x][y] of the prediction image of nCbH−1 is derived as follows.

Next, in a case that predFlagL0 is equal to 1, and predFlagL1 is equal to 0, the pixel value pbSamples[x][y] of the prediction image is derived as follows.
if (log 2Wd>=1)

pbSamples[$x$][$y$]=Clip3(0,(1<<bitDepth)−1,((predSamplesL0[$x$][$y$]*$w$0+2^(log 2Wd−1))>>log 2Wd)+$o$0)

else pbSamples[$x$][$y$]=Clip3(0,(1<<bitDepth)−1,predSamplesL0[$x$][$y$]*$w$0+$o$0)

Otherwise, in a case that predFlagL0 is 0 and predFlagL1 is 1, the pixel value pbSamples[x][y] of the prediction image is derived as follows.
if (log 2Wd>=1)

pbSamples[$x$][$y$]=Clip3(0,(1<<bitDepth)−1,((predSamplesL1[$x$][$y$]*$w$1+2^(log 2Wd−1))>>log 2Wd)+$o$1)

else pbSamples[$x$][$y$]=Clip3(0,(1<<bitDepth)−1,predSamplesL1[$x$][$y$]*$w$1+$o$1)

Otherwise, in a case that predFlagL0 is equal to 1 and predFlagL1 is equal to 1, the pixel value pbSamples[x][y] of the prediction image is derived as follows.

pbSamples[$x$][$y$]=Clip3(0,(1<<bitDepth)−1,(predSamplesL0[$x$][$y$]*$w$0+predSamplesL1[$x$][$y$]*$w$1+(($o$0+$o$1+1)<<log 2Wd))>>(log 2Wd+1))

However, according to the method described in "Versatile Video Coding (Draft 7)," JVET-P2001-vE, Joint Video Exploration Team (JVET) of ITU-T SG 16 WP 3 and ISO/IEC JTC 1/SC 29/WG 11, 2019-11-14, a weight coefficient LumaWeightL0[i] of luminance and a flag luma_weight_l0_flag[i] indicating whether or not an offset value luma_offset_10_[refIdxL0] is present are present for each reference picture in the L0 list, for example, while only one luma_log 2_weight_denom of luminance is present as a right shift value corresponding to a denominator of the weight coefficient. Thus, in a case that the weight coefficient and the offset value for the reference list are not present, weight prediction processing is performed by configuring the value of the weight coefficient to 2 to the power of luma_log 2_weight_denom and configuring the offset value to 0. Thus, in a case that the weight coefficient and the offset value for the reference list are not present at the time of L0 prediction or L1 prediction, weight prediction processing is performed although typical prediction processing is supposed to be performed. Also, in a case that the weight coefficient and the offset value are not present for both the L0 list and the L1 list at the time of dual prediction, weight prediction processing is performed while ordinary dual prediction processing is supposed to be performed. In this manner, there is a problem in that weight prediction processing may be performed even in a case that typical prediction processing has to be performed.

Thus, the function WeightedPredFlag (slice_type, cIdx, refIdxL0, and refIdxL1) is defined as follows in the present embodiment.

WeightedPredFlag(slice_type,cIdx,refIdxL0,refIdxL1)=
(slice_type==*P*&&pps_weighted_pred_flag)?
((cIdx==0)?luma_weight_*l*0_flag[refIdxL0]:
chroma_weight_*l*0_flag[refIdxL0]):

((slice_type==*B*&&pps_weighted_bipred_flag)?

((refIdxL0>=0&& refIdxL1>=0)?

((cIdx==0)?(luma_weight_*l*0_flag[refIdxL0]
||luma_weight_*l*1_flag[refIdxL1]):
(chroma_weight_*l*0_flag[refIdxL0]
||Chroma_weight_*l*1_flag[refIdxL1])):

((refIdxL0>=0&& refIdxL1<0)?

((cIdx==0)?luma_weight_*l*0_flag[refIdxL0]:
chroma_weight_*l*0_flag[refIdxL0]):

((refIdxL0<0&& refIdxL1>=0)?

((cIdx==0)?luma_weight_*l*1_flag[refIdxL1]:
chroma_weight_*l*1_flag[refIdxL1]):0))):0)

This function WeightedPredFlag (slice_type, cIdx, refIdxL0, and refIdxL1) can be used in a case that processing that is exclusive from the weight prediction is performed. The syntax in FIG. 30 is an example for signaling bcw_idx[x0][y0] only in a case that the weight prediction coefficient is not present in order to cause the BCW prediction and the weight prediction to exclusively operate.

In addition to this configuration, it is also possible to configure a condition that the value of the function WeightedPredFlag (B, 0, refIdxL0, and refIdxL1) is equal to 0 in a case that DMVR processing and BDOF processing are applied in a case that a luminance weight coefficient is not present in weight prediction processing.

It is possible to configure a condition that both the values of the function WeightedPredFlag (B, 0, refIdxL0, and refIdxL1) and the function WeightedPredFlag (B, 1, refIdxL0, and refIdxL1) are equal to 0 in a case that DMVR processing and BDOF processing are applied in a case that no weight coefficient is present for both luminance and chrominance in the weight prediction processing.

For the variable weightedPredFlag that indicates whether or not to perform weight prediction processing, the value of the function WeightedPredFlag (slice_type, cIdx, refIdxL0, and refIdxL1) may be configured.

Also, according to the method described in "Versatile Video Coding (Draft 7)," JVET-P2001-vE, Joint Video Exploration Team (JVET) of ITU-T SG 16 WP 3 and ISO-IEC JTC 1/SC 29/WG 11, 2019-11-14, there is a problem in that weight prediction processing is performed in a case that typical prediction processing has to be performed as a result even in a case that the value of the variable weightedPredFlag is 1, and the weight prediction processing has been called.

Thus, the weight prediction unit 3094 derives the variable weightedPredFlag as follows in another embodiment of the present embodiment.

In a case that slice_type is equal to P, the variable weightedPredFlag is configured to weightedPredFlag=(cIdx==0)?luma_weight_*l*0_flag
[refIdxL0]: chroma_weight_*l*0_flag[refIdxL0].

Otherwise (in a case that slice_type is equal to B), the following configuring is performed.

In a case that refIdxL0 is equal to or greater than 0 and refIdxL1 is equal to 0, the variable weightedPredFlag is configured to weightedPredFlag=(cIdx==0)?(luma_weight_*l*0_flag
[refIdxL0]||luma_weight_*l*1_flag[refIdxL1]):
(chroma_weight_*l*0_flag[refIdxL0]
||chroma_weight_*l*1_flag[refIdxL1]).

In a case that refIdxL0 is equal to or greater than 0 and refIdxL1 is less than 0, the variable weightedPredFlag is configured to weightedPredFlag=(cIdx==0)? luma_weight_l0_flag[refIdxL0]: chroma_weight_l0_flag [refIdxL0].

In a case that refIdxL0 is less than 0 and refIdxL1 is equal to or greater than 0, the variable weightedPredFlag is configured to weightedPredFlag=(cIdx==0)? luma_weight_l1_flag[refIdxL1]: chroma_weight_l0_flag [refIdxL1].

Otherwise, the variable weightedPredFlag is configured to weightedPredFlag=0.

It is possible to define that weight prediction is not to be performed for each of luminance and chrominance signals in a case that the weight coefficient is not present by performing derivation as described above and thereby to solve the aforementioned problem.

Further, a method for solving the aforementioned problem within weight prediction processing will be described as another embodiment of the present embodiment.

In a case that the value of the variable weightedPredFlag is equal to 1 and the value of the variable bcwIdx is equal to 0, the prediction image pbSamples is derived as follows in weight prediction processing.

The variable shift1 is configured to be equal to Max(2, 14−bitDepth). The variables log 2Wd, o0, o1, w0, and w1 are derived as follows.

In a case that cIdx is 0 and corresponds to luminance, then the following operations are applied.

log 2Wd=luma_log 2_weight_denom+shift1

WeightL0Flag=luma_weight_*l*0_flag[refIdxL0]

WeightL1Flag=luma_weight_*l*1_flag[refIdxL1]

$w$0=LumaWeightL0[refIdxL0]

$w$1=LumaWeightL1[refIdxL1]

$o$0=luma_offset_*l*0[refIdxL0]<<(bitDepth−8)

$o$1=luma_offset_*l*1[refIdxL1]<<(bitDepth−8)

Otherwise, (chrominance in a case that cIdx is not equal to 0), the following operations are applied.

log 2Wd=ChromaLog 2WeightDenom+shift1

WeightL0Flag=chroma_weight_*l*0_flag[refIdxL0]

WeightL1Flag=chroma_weight_*l*1_flag[refIdxL1]

$w$0=ChromaWeightL0[refIdxL0][cIdx−1]

$w$1=ChromaWeightL1[refIdxL1][cIdx−1]

$o$0=ChromaOffsetL0[refIdxL0][cIdx−1]<<(bitDepth−8)

$o$1=ChromaOffsetL1[refIdxL1][cIdx−1]<<(bitDepth−8)

x=0 . . . nCbW−1 and y=0 . . . . The pixel value pbSamples[x][y] of the prediction image of nCbH−1 is derived as follows.

In a case that predFlagL0 is equal to 1 and predFlagL1 is equal to 0, the pixel value pbSamples[x][y] of the prediction image is derived as follows.
if (WeightL0Flag==0)

pbSamples[x][y]=Clip3(0,(1<<bitDepth)−1,(predSamplesL0[x][y]+offset1)>>shift1)

else if (log 2Wd>=1)

pbSamples[x][y]=Clip3(0,(1<<bitDepth)−1,((predSamplesL0[x][y]*w0+2^(log 2Wd−1))>>log 2Wd)+o0)

else pbSamples[x][y]=Clip3(0,(1<<bitDepth)−1,predSamplesL0[x][y]*w0+o0)

Otherwise, in a case that predFlagL0 is 0 and predFlagL1 is 1, the pixel value pbSamples[x][y] of the prediction image is derived as follows.
if (WeightL1Flag==0)

pbSamples[x][y]=Clip3(0,(1<<bitDepth)−1,(predSamplesL1[x][y]+offset1)>>shift1)

else if (log 2Wd>=1)

pbSamples[x][y]=Clip3(0,(1<<bitDepth)−1,((predSamplesL1[x][y]*w1+2^(log 2Wd−1))>>log 2Wd)+o1)

else pbSamples[x][y]=Clip3(0,(1<<bitDepth)−1,predSamplesL1[x][y]*w1+o1)

Otherwise, in a case that predFlagL0 is equal to 1 and predFlagL1 is equal to 1, the pixel value pbSamples[x][y] of the prediction image is derived as follows.
if (WeightL0Flag==O&&WeightL1Flag==0)

pbSamples[x][y]=Clip3(0,(1<<bitDepth)−1,(predSamplesL0[x][y]+predSamplesL1[x][y]+offset2)>>shift2)

else pbSamples[x][y]=Clip3(0,(1<<bitDepth)−1,(predSamplesL0[x][y]*w0+predSamplesL1[x][y]*w1+((o0+o1+1)<<log 2Wd))>>(log 2Wd+1))

It is possible to define that weight prediction is not to be performed for each of luminance and chrominance signals in a case that the weight coefficient is not present by performing derivation as described above and thereby to solve the aforementioned problem.

As another problem, although a new concept of picture header has been introduced in "Versatile Video Coding (Draft 7)," JVET-P2001-vE, Joint Video Exploration Team (JVET) of ITU-T SG 16 WP 3 and ISO/IEC JTC 1/SC 29/WG 11, 2019-11-14, there is a problem in that there is no compatibility with the new concept.

Thus, flag information for weight prediction is newly introduced to the picture header in another embodiment of the disclosure. Specifically, pic_weighted_pred_flag and pic_weighted_bipred_flag are introduced into picture_header_rbsp( ) as illustrated in FIG. 31B, and pred_weight_table( ) is called in a case that pic_weighted_pred_flag or pic_weighted_bipred_flag is 1 in the slice header, as illustrated in FIG. 31C.

It is possible to switch the weight prediction processing for each picture by employing syntax as described above.

As another problem, there is a problem in that conditions for applying weight prediction processing for chrominance signal processing is not clear since one of conditions for the variable dmvrFlag that is a variable indicating whether or not to perform DMVR processing to be TRUE is defined only for weight prediction processing of a luminance signal as a condition that both luma_weight_l0_flag[refIdxL0] and luma_weight_l1_flag[refIdxL1] are 0 although the variable weightedPredFlag that indicates whether or not to perform weight prediction processing is configured to be equal to pps_weighted_bipred_flag&&(!dmvrFlag) defined by the PPS in a case that slice_type is equal to B in "Versatile Video Coding (Draft 7),' JVET-P2001-vE, Joint Video Exploration Team (JVET) of ITU-T SG 16 WP 3 and ISO/IEC JTC 1/SC 29/WG 11, 2019-11-14.

Thus, the variable weightedPredFlag is configured to be equal to pps_weighted_bipred_flag&&!(dmvrFlag&&cIdx==0) that is defined by the PPS in a case that slice_type is equal to B in another embodiment of the present embodiment.

The weight prediction processing in the case of a chrominance signal appropriately operates even in a case that dvmrFlag is 1 by employing the conditions as described above, and conditions for applying weight prediction processing thus become clear.

Alternatively, weight prediction processing may not be performed both for luminance and chrominance in both DMVR processing and BDOF processing. Then, weightedPredFlag is configured to be equal to pps_weighted_bipred_flag&&!dmvrFlag&&!bdofAvailableFlag that is defined by the PPS in a case that slice_type is equal to B.

As another problem, there is a problem in that a relationship between weight prediction and IntraInter combining processing is not clear in "Versatile Video Coding (Draft 7),' JVET-P2001-vE, Joint Video Exploration Team (JVET) of ITU-T SG 16 WP 3 and ISO/IEC JTC 1/SC 29/WG 11, 2019-11-14.

Thus, the variable weightedPredFlag is configured as follows.

In a case that slice_type is equal to P, weightedPredFlag is configured to be equal to pps_weighted_pred_flag&&(!ciip_flag). pps_weighted_pred_flag is a flag that is defined by the PPS.

Otherwise, in a case that slice_type is equal to B, weightedPredFlag is configured to be equal to pps_weighted_bipred_flag&&(!dmvrFlag)&&(!ciip_flag). pps_weighted_bipred_flag is a flag that is defined by the PPS.

Alternatively, in addition to the method for configuring the variable weightedPredFlag described in the aforementioned plurality of embodiments, a condition of weightedPredFlag=weightedPredFlag&&(!ciip_flag) may be added.

The conditions for applying weight prediction processing becomes clear by employing the conditions as described above.

BCW Prediction

Bi-prediction with CU-level weights (BCW) prediction is a prediction method capable of switching a weight coefficient determined in advance in a CU level.

Two variables nCbW and nCbH designating the width and the height of a current coding block, two arrays predSamplesL0 and predSamplesL1 of (nCbW)×(nCbH), flags predFlagL0 and predFlagL1 indicating whether or not to use a prediction list, reference indexes refIdxL0 and refIdxL1, BCW prediction index bcw_idx, and a variable cIdx for designating indexes of luminance and chrominance components are input to perform BCW prediction processing, and a pixel value of a prediction image of an array pbSamples of (nCbW)×(nCbH) is output.

In a case that sps_bcw_enabled_flag indicating whether or not to use this prediction in an SPS level is TRUE, a variable weightedPredFlag is 0, there are no weight prediction coefficients for the reference pictures indicated by the two reference indexes refIdxL0 and refIdxL1, and a coding block size is equal to or less than a specific size, bcw_idx of the syntax in a CU level is explicitly signaled, and the value is put into a variable bcwIdx. In a case that bcw_idx is not present, 0 is put to the variable bcwIdx.

In a case that the variable bcwIdx is 0, the pixel value of the prediction image is derived as follows.

pbSamples[*x*][*y*]=Clip3(0,(1<<bitDepth)−1,(predSamplesL0[*x*][*y*]+predSamplesL1[*x*][*y*]+offset2)>>shift2)

Otherwise (in a case that bcwIdx is not equal to 0), the following operations are applied.

A variable w1 is configured to be equal to bcwWLut [bcwIdx]. bcwWLut[k]={4. 5. 3. 10, −2}.

A variable w0 is configured to (8−w1). Also, the pixel value of the prediction image is derived as follows.

pbSamples[*x*][*y*]=Clip3(0,(1<<bitDepth)−1,(*w*0*predSamplesL0[*x*][*y*]+*w*1*predSamplesL1[*x*][*y*]+offset3)>>(shift2+3))

In a case that BCW prediction is used in the AMVP prediction mode, the inter prediction parameter decoder 303 decodes bcw_idx and sends bvw_idx to the BCW unit 30955. In a case that BCW prediction is used in the merge prediction mode, the inter prediction parameter decoder 303 decodes a merge index merge_idx, and the merge candidate derivation unit 30361 derives bcwIdx of merge candidates. Specifically, the merge candidate derivation unit 30361 uses a weight coefficient of an adjacent block used for derivation of merge candidates as a weight coefficient of the merge candidates used for the target block. In other words, a weight coefficient used in the past is taken over as the weight coefficient of the target block in the merge mode.

Intra Prediction Image Generation Unit 310

In a case that predMode indicates an intra prediction mode, the intra prediction image generation unit 310 performs intra prediction using intra prediction parameters input from the intra prediction parameter derivation unit 304 and reference pixels read from the reference picture memory 306.

The inverse quantization and inverse transform unit 311 inversely quantizes a quantization transform coefficient input from the parameter decoder 302 to obtain a transform coefficient.

The addition unit 312 adds a prediction image of a block input from the prediction image generation unit 308 and a prediction error input from the inverse quantization and inverse transform unit 311 for each pixel to generate a decoded image of the block. The addition unit 312 stores the decoded image of the block in the reference picture memory 306 and outputs the decoded image of the block to the loop filter 305.

The inverse quantization and inverse transform unit 311 inversely quantizes a quantization transform coefficient input from the parameter decoder 302 to obtain a transform coefficient.

The addition unit 312 adds a prediction image of a block input from the prediction image generation unit 308 and a prediction error input from the inverse quantization and inverse transform unit 311 for each pixel to generate a decoded image of the block. The addition unit 312 stores the decoded image of the block in the reference picture memory 306 and outputs the decoded image of the block to the loop filter 305.

Configuration of Video Coding Apparatus

Figure 23:
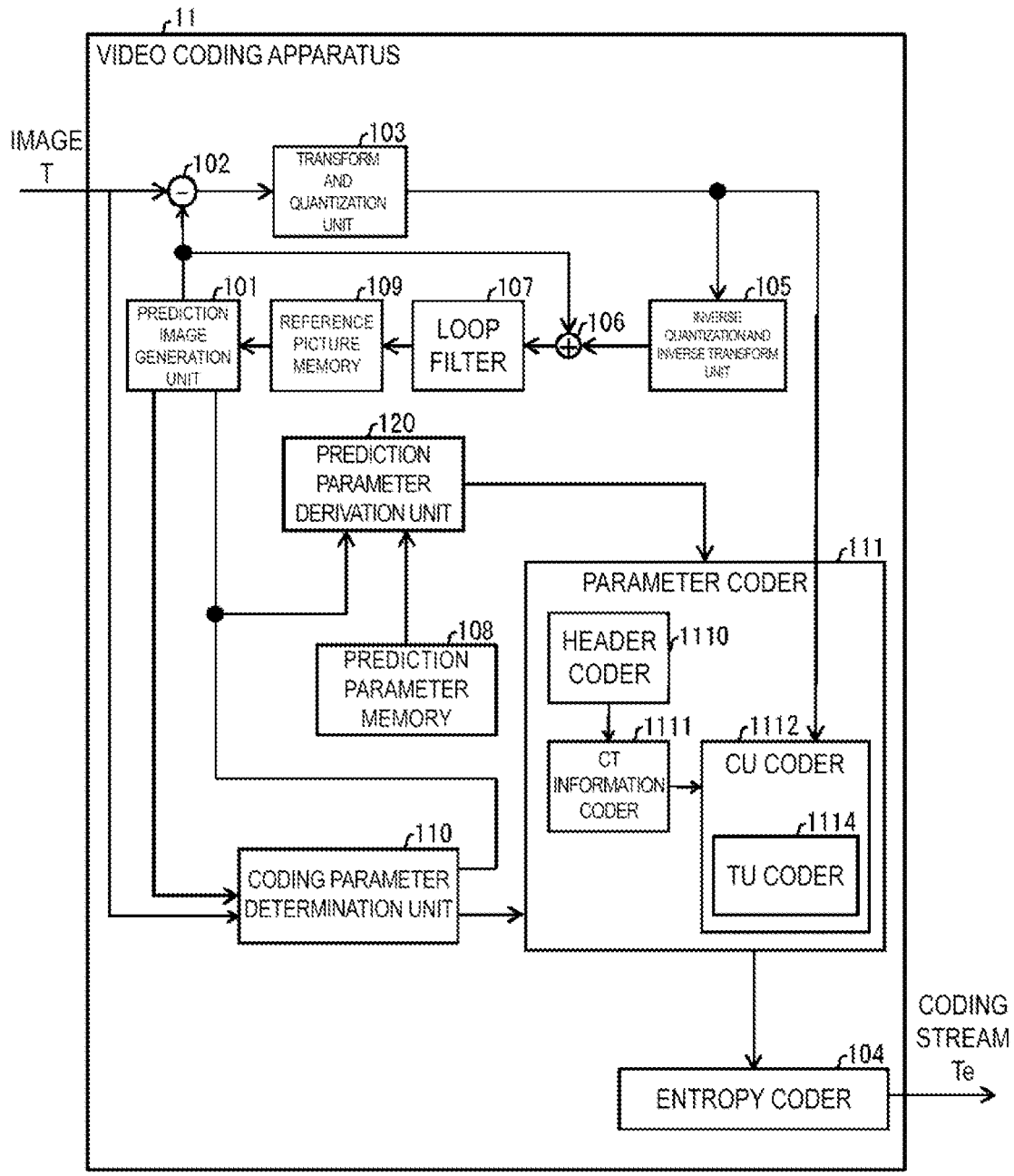
FIG. 23 is a block diagram illustrating a configuration of the video coding apparatus.

Next, a configuration of the video coding apparatus 11 according to the present embodiment will be described. FIG. 23 is a block diagram illustrating a configuration of the video coding apparatus 11 according to the present embodiment. The video coding apparatus 11 is configured to include a prediction image generation unit 101, a subtraction unit 102, a transform and quantization unit 103, an inverse quantization and inverse transform unit 105, an addition unit 106, a loop filter 107, a prediction parameter memory (prediction parameter storage unit, frame memory) 108, a reference picture memory (reference image storage unit, frame memory) 109, a coding parameter determination unit 110, a parameter coder 111, a prediction parameter derivation unit 120, and an entropy coder 104.

The prediction image generation unit 101 generates a prediction image for each CU. The prediction image generation unit 101 includes the inter prediction image generation unit 309 and the intra prediction image generation unit 310, which have been described above, and description thereof will be omitted.

The subtraction unit 102 generates a prediction error by subtracting a pixel value of a prediction image of a block input from the prediction image generation unit 101 from a pixel value of the image T. The subtraction unit 102 outputs the prediction error to the transform and quantization unit 103.

The transform and quantization unit 103 calculates a transform coefficient for the prediction error input from the subtraction unit 102 through frequency transform and derives a quantization transform coefficient through quantization. The transform and quantization unit 103 outputs the quantization transform coefficient to the parameter coder 111 and the inverse quantization and inverse transform unit 105.

The inverse quantization and inverse transform unit 105 is the same as the inverse quantization and inverse transform unit 311 (FIG. 7) in the video decoding apparatus 31, and description thereof will be omitted. The calculated prediction error is output to the addition unit 106.

The parameter coder 111 includes a header coder 1110, a CT information coder 1111, and a CU coder 1112 (prediction mode coder). The CU coder 1112 further includes a TU coder 1114. Hereinafter, overview operations of each module will be described.

The header coder 1110 performs coding processing of parameters such as header information, splitting information, prediction information, and a quantization transform coefficient, and the like.

The CT information coder 1111 codes QT, MT (BT, TT) splitting information and the like.

The CU coder 1112 codes CU information, prediction information, splitting information, and the like.

The TU coder 1114 codes QP update information and a quantization prediction error in a case that the prediction error is included in a TU.

The CT information coder 1111 and the CU coder 1112 supplies, to the parameter coder 111, inter prediction parameters (predMode, merge_flag, merge_idx, inter_pred_idc, refIdxLX, mvp_LX_idx, and mvdLX), intra prediction parameters (intra_luma_mpm_flag, intra_luma_mpm_idx, intra_luma_mpm_reminder, and intra_chroma_pred_mode), and syntax elements such as a quantization transform coefficient.

The quantization transform coefficient and coding parameters (splitting information, prediction parameters) are input from the parameter coder 111 to the entropy coder 104. The entropy coder 104 entropy-codes these to generate a coding stream Te and outputs the coding stream Te.

Figure 24:
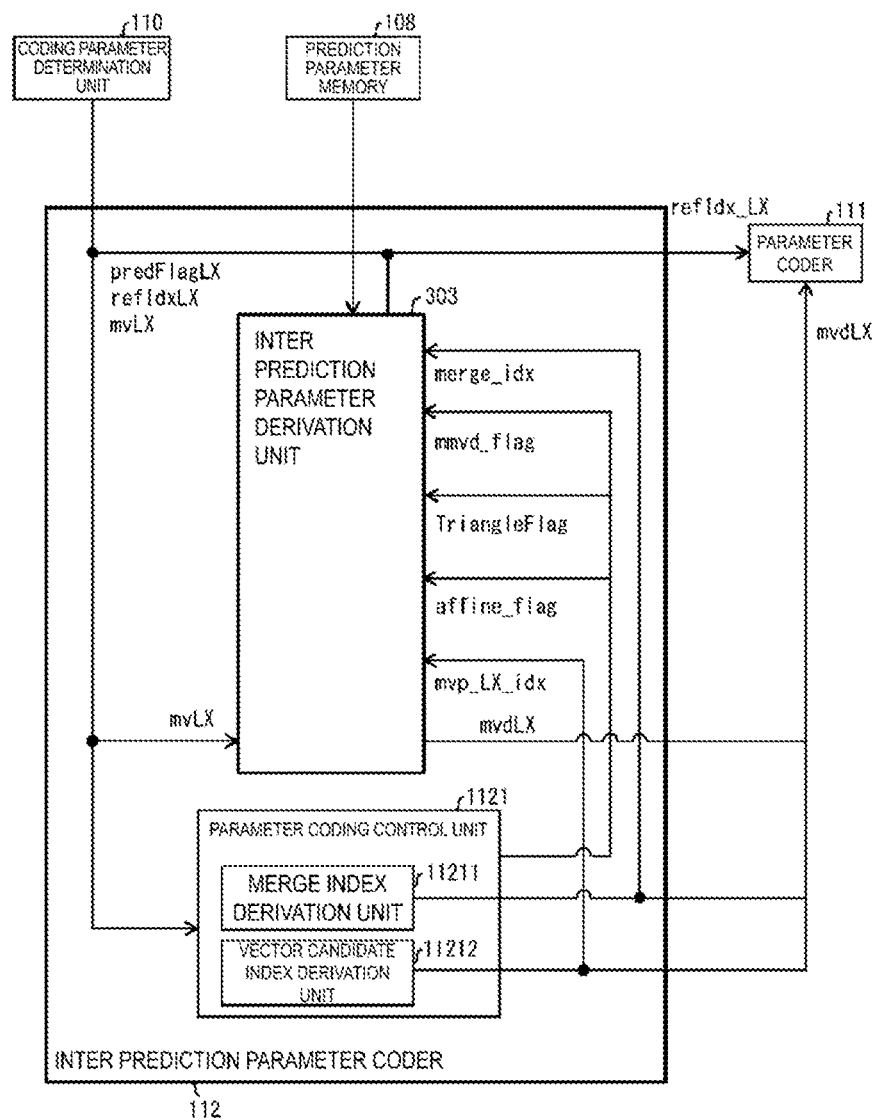
FIG. 24 is a schematic diagram illustrating a configuration of an inter prediction parameter coder.

The prediction parameter derivation unit 120 is a means that includes an inter prediction parameter coder 112 and an intra prediction parameter coder 113 and derives inter prediction parameters and intra prediction parameters from the parameters input from the coding parameter determination unit 110. The derived inter prediction parameter and the intra prediction parameter are output to the parameter coder 111.
Configuration of Inter Prediction Parameter Coder The inter prediction parameter coder 112 is configured to include a parameter coding control unit 1121 and an inter prediction parameter derivation unit 303 as illustrated in FIG. 24. The inter prediction parameter derivation unit 303 has a configuration that is common to that in the video decoding apparatus. The parameter coding control unit 1121 includes a merge index derivation unit 11211 and a vector candidate index derivation unit 11212.

The merge index derivation unit 11211 derives merge candidates and the like and outputs the merge candidates and the like to the inter prediction parameter derivation unit 303. The vector candidate index derivation unit 11212 derives prediction vector candidates and the like and outputs the prediction vector candidates and the like to the inter prediction parameter derivation unit 303 and the parameter coder 111.
Configuration of Intra Prediction Parameter Coder 113

Figure 25:
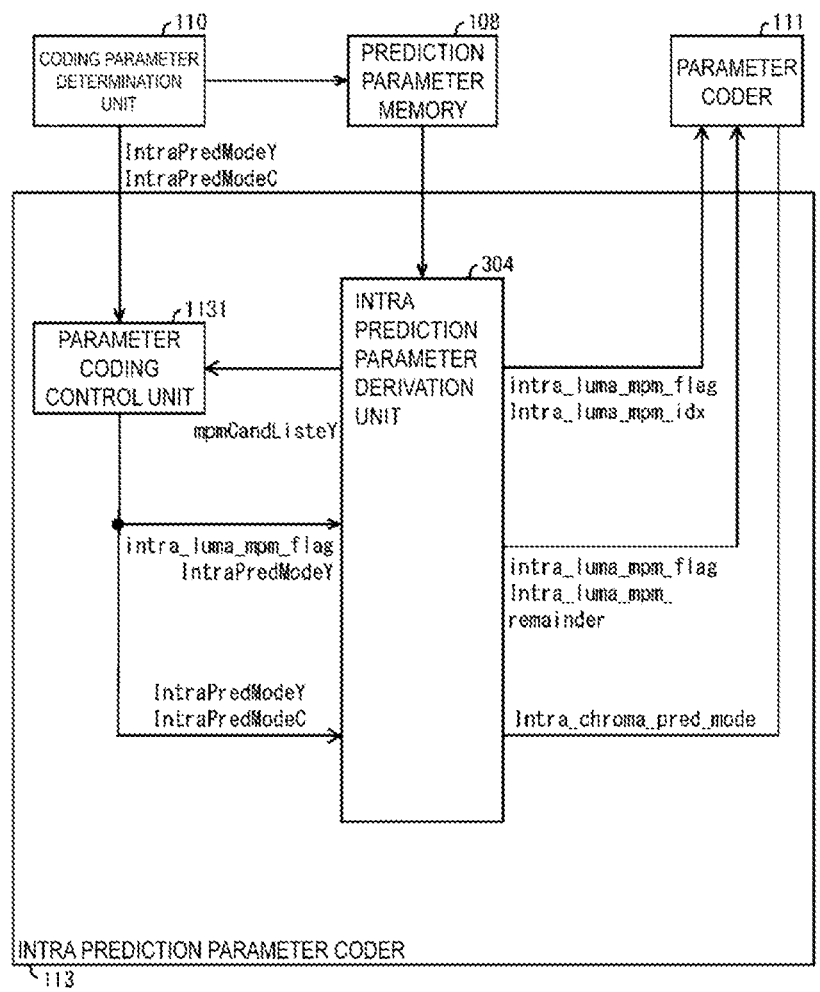
FIG. 25 is a schematic diagram illustrating a configuration of the intra prediction parameter coder.

The intra prediction parameter coder 113 includes a parameter coding control unit 1131 and an intra prediction parameter derivation unit 304 as illustrated in FIG. 25. The intra prediction parameter derivation unit 304 has a configuration that is common to that in the video decoding apparatus.

The parameter coding control unit 1131 derives IntraPredModeY and IntraPredModeC. Further, the parameter coding control unit 1131 determines intra_luma_mpm_flag with reference to mpmCandList[ ]. These prediction parameters are output to the intra prediction parameter derivation unit 304 and the parameter coder 111.

However, inputs to the inter prediction parameter derivation unit 303 and the intra prediction parameter derivation unit 304 are made to the coding parameter determination unit 110 and the prediction parameter memory 108 and are output to the parameter coder 111 unlike the video decoding apparatus.

The addition unit 106 adds a pixel value of a prediction block input from the prediction image generation unit 101 and a prediction error input from the inverse quantization and inverse transform unit 105 for each pixel to generate a decoded image. The addition unit 106 stores the generated decoded image in the reference picture memory 109.

The loop filter 107 performs a deblocking filter, SAO, and ALF on the decoded image generated by the addition unit 106. Note that the loop filter 107 does not necessarily include the aforementioned three types of filters and may be configured to include only a deblocking filter, for example.

The prediction parameter memory 108 stores the prediction parameters generated by the coding parameter determination unit 110 at a position determined in advance for each target picture and for each CU.

The reference picture memory 109 stores the decoded image generated by the loop filter 107 at a position determined in advance for each target picture and each CU.

The coding parameter determination unit 110 selects one set among a plurality of configures of coding parameters. The coding parameters are QT, BT, or TT splitting information described above, prediction parameters, or parameters as targets of coding that are generated in relation to these. The prediction image generation unit 101 generates a prediction image using these coding parameters.

The coding parameter determination unit 110 calculates, for each of the plurality of configures, an RD cost value indicating the size of the amount of information and a coding error. The RD cost value is, for example, a sum of an amount of coding and a value obtained by multiplying a square error by a coefficient $\lambda$. The amount of coding is the amount of information of the coding stream Te obtained by entropy-coding a quantization error and coding parameters. The square error is a square sum of the prediction error calculated by the subtraction unit 102. The coefficient $\lambda$ is a preset real number that is greater than zero. The coding parameter determination unit 110 selects a set of coding parameters that minimize the calculated cost value. The coding parameter determination unit 110 outputs the determined coding parameters to the parameter coder 111 and the prediction parameter derivation unit 120.

Note that a part of the video coding apparatus 11 and the video decoding apparatus 31 in the aforementioned embodiments, for example, the entropy decoder 301, the parameter decoder 302, the loop filter 305, the prediction image generation unit 308, the inverse quantization and inverse transform unit 311, the addition unit 312, the prediction parameter derivation unit 320, the prediction image generation unit 101, the subtraction unit 102, the transform and quantization unit 103, the entropy coder 104, the inverse quantization and inverse transform unit 105, the loop filter 107, the coding parameter determination unit 110, the parameter coder 111, and the prediction parameter derivation unit 120 may be realized by a computer. In that case, the part may be realized by recording a program for realizing the control functions in a computer-readable recording medium and causing a computer system to read and execute the program recorded in the recording medium. Note that the "computer system" mentioned here refers to a computer system built in either the video coding apparatus 11 or the video decoding apparatus 31 and is assumed to include an OS and hardware such as a peripheral apparatus. Also, the "computer-readable recording medium" refers to a portable medium such as a flexible disk, a magneto-optical disk, a ROM, or a CD-ROM or a storage device such as a hard disk built in the computer system. Further, the "computer-readable recording medium" may include a medium that dynamically retains the program for a short period of time, such as a communication line in a case that the program is transmitted through a network such as the Internet or through a communication line such as a telephone line, and may also include a medium that retains the program for a specific period of time, such as a volatile memory included inside the computer system that serves as a server or a client in such a case. Also, the aforementioned program may be one for realizing some of the aforementioned functions, and also may be one capable of realizing the aforementioned functions in combination with a program that has already been recorded in the computer system.

A part or all of the video coding apparatus 11 and the video decoding apparatus 31 in the embodiments described above may be realized as an integrated circuit such as a large scale integration (LSI). Each functional block of the video coding apparatus 11 and the video decoding apparatus 31 may be individually realized as processors, or a part or all of the functional blocks may be integrated into processors. Also, the circuit integration technique is not limited to the LSI, and the integrated circuits may be realized as dedicated circuits or general-purpose processors. In a case that with advances in semiconductor technologies, a circuit integration technology that replaces the LSI appears, an integrated circuit based on the technology may be used.

Although the embodiments of the disclosure have been described above in detail with reference to the drawings, specific configurations are not limited to those described above, and various modifications in design can be made without departing from the gist of the disclosure.

APPLICATION EXAMPLES

The aforementioned video coding apparatus 11 and the video decoding apparatus 31 can be used by being installed in various apparatuses that perform transmission, reception, recording, and reconstruction of videos. Note that the videos may be natural videos imaged by a camera or the like or may be artificial videos (including CGs and GUIs) generated by a computer or the like.

First, the fact that the aforementioned video coding apparatus 11 and the video decoding apparatus 31 can be used for transmitting and receiving videos will be described with reference to FIG. 2.

Figure 2:
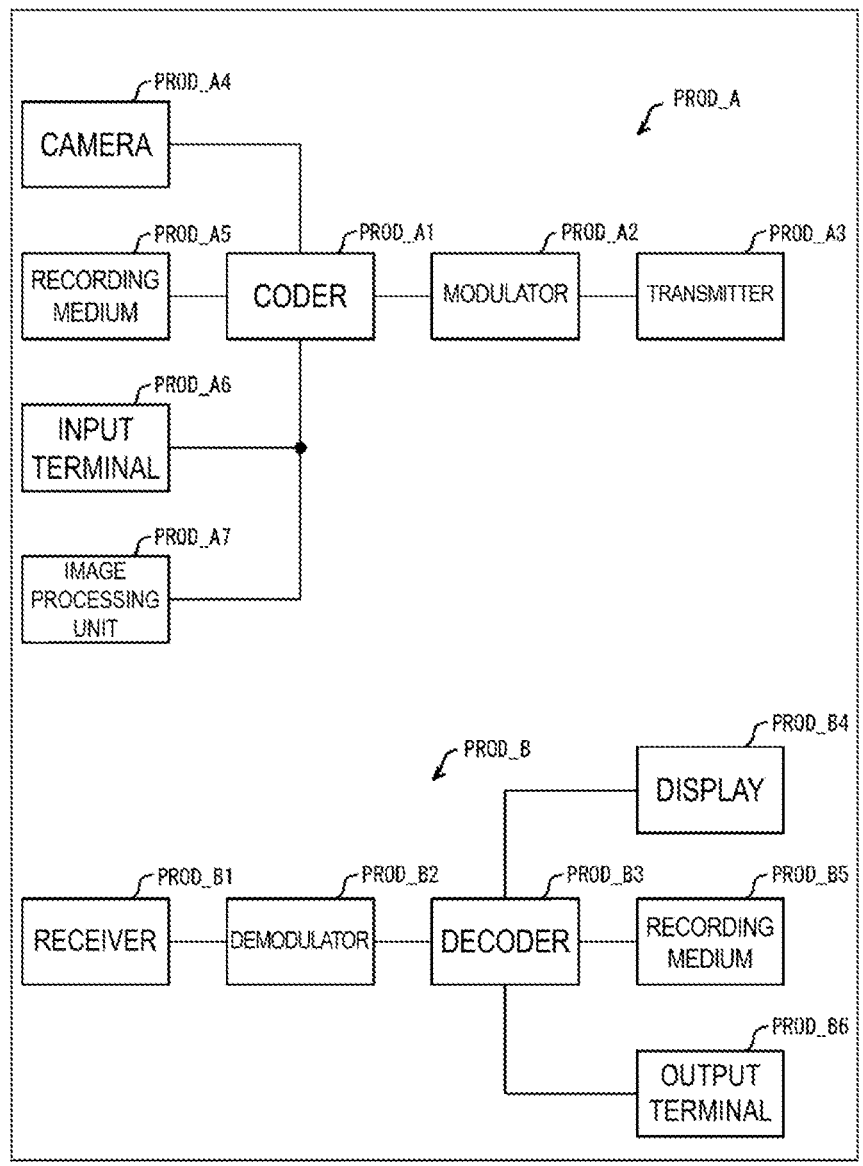
FIG. 2 is a diagram illustrating configurations of a transmitting apparatus with a video coding apparatus mounted therein and a receiving apparatus with a video decoding apparatus mounted therein, according to the present embodiment. PROD_A denotes the transmitting apparatus with the video coding apparatus mounted therein, and PROD_B denotes the receiving apparatus with the video decoding apparatus mounted therein.

PROD_A in FIG. 2 is a block diagram illustrating a configuration of a transmitting apparatus PROD_A with the video coding apparatus 11 mounted therein. As illustrated in the drawing, the transmitting apparatus PROD_A includes a coder PROD_A1 that obtains coded data by coding a video, a modulator PROD_A2 that obtains a modulation signal by modulating a carrier wave with the coded data obtained by the coder PROD_A1, and a transmitter PROD_A3 that transmits the modulation signal obtained by the modulator PROD_A2. The aforementioned video coding apparatus 11 is used as the coder PROD_A1.

The transmitting apparatus PROD_A may further include a camera PROD_A4 that images a video, a recording medium PROD_A5 that records the video, an input terminal PROD_A6 for inputting a video from the outside, and an image processing unit A7 that generates or processes an image, as supply sources of a video to be input to the coder PROD_A1. Although an exemplary configuration in which the transmitting apparatus PROD_A includes all of these is illustrated in the drawing, a part thereof may be omitted.

Note that the recording medium PROD_A5 may record videos which have not been coded or may record videos coded in a coding scheme for recording that is different from a coding scheme for transmission. In the latter case, a decoder (not illustrated) that decodes coded data read from the recording medium PROD_A5 in accordance with the coding scheme for recording is preferably interposed between the recording medium PROD_A5 and the coder PROD_A1.

PROD_B in FIG. 2 is a block diagram illustrating a configuration of a receiving apparatus PROD_B with the video decoding apparatus 31 mounted therein. As illustrated in the drawing, the receiving apparatus PROD_B includes a receiver PROD_B1 that receives modulation signals, a demodulator PROD_B2 that obtains coded data by demodulating the modulation signals received by the receiver PROD_B1, and a decoder PROD_B3 that obtains videos by decoding the coded data obtained by the demodulator PROD_B2. The aforementioned video decoding apparatus 31 is used as the decoder PROD_B3.

The receiving apparatus PROD_B may further include a display PROD_B4 that displays videos, a recording medium PROD_B5 for recording the videos, and an output terminal PROD_B6 for outputting the videos to the outside, as supply destinations of the videos to be output by the decoder PROD_B3. Although an exemplary configuration in which the receiving apparatus PROD_B includes all of these components is illustrated in the drawing, some of the components may be omitted.

Note that the recording medium PROD_B5 may record videos which have not been coded or may record videos coded in a coding scheme for recording that is different from a coding scheme for transmission. In the latter case, a coder (not illustrated) that codes videos acquired from the decoder PROD_B3 in accordance with the coding scheme for recording is preferably interposed between the decoder PROD_B3 and the recording medium PROD_B5.

Note that a transmission medium for transmitting the modulation signals may be a wireless medium or may be a wired medium. In addition, a transmission form in which the modulation signals are transmitted may be broadcasting (here, this indicates a transmission form in which a transmission destination is not specified in advance) or may be communication (here, this indicates a transmission form in which a transmission destination is specified in advance). In other words, the transmission of the modulation signals may be realized by any of wireless broadcasting, wired broadcasting, wireless communication, and wired communication.

For example, a broadcasting station (broadcasting equipment or the like)/a receiving station (a television receiver or the like) for digital terrestrial broadcasting is an example of the transmitting apparatus PROD_A/the receiving apparatus PROD_B for transmitting and/or receiving the modulation signals through the wireless broadcasting. Also, the broadcasting station (broadcasting equipment or the like)/a receiving station (a television receiver or the like) for cable television broadcasting is an example of the transmitting apparatus PROD_A/the receiving apparatus PROD_B for transmitting and/or receiving the modulation signals through the wired broadcasting.

In addition, a server (a workstation or the like)/a client (a television receiver, a personal computer, a smartphone, or the like) for video on demand (VOD) services, video sharing services, and the like using the Internet is an example of the transmitting apparatus PROD_A/the receiving apparatus PROD_B for transmitting and/or receiving the modulation signals through communication (typically, either a wireless medium or a wired medium is used as a transmission medium in a LAN, and a wired medium is used as a transmission medium in a WAN). Here, the personal computer includes a desktop PC, a laptop PC, or a tablet PC. In addition, the smartphone includes a multifunctional mobile telephone terminal as well.

A client of a video sharing service has a function of coding videos imaged with a camera and uploading the videos to a server, in addition to a function of decoding coded data downloaded from a server and displaying the coded data on a display. In other words, the client of the video sharing service functions both as the transmitting apparatus PROD_A and as the receiving apparatus PROD_B.

Next, the fact that the aforementioned video coding apparatus 11 and the video decoding apparatus 31 can be used for recording and reconstructing videos will be described with reference to FIG. 3.

Figure 3:
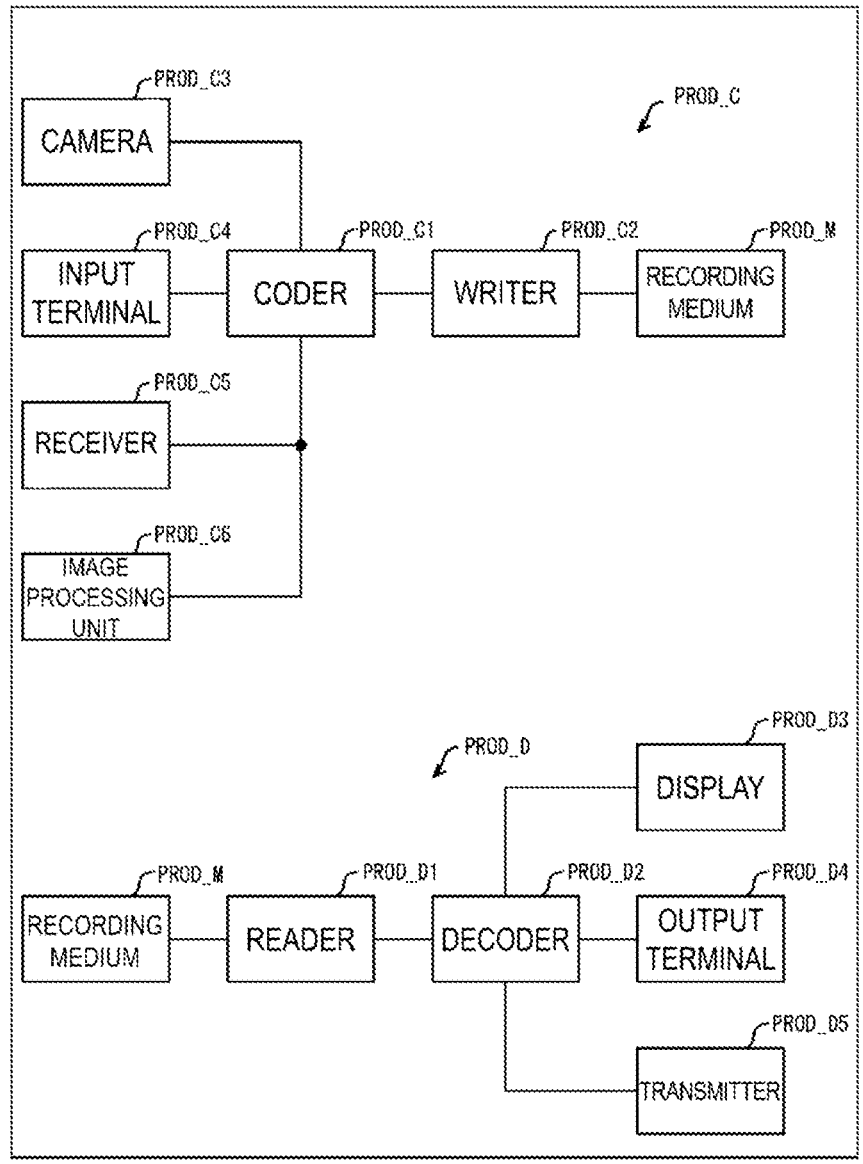
FIG. 3 is a diagram illustrating configurations of a recording apparatus with the video coding apparatus mounted therein and a reconstruction apparatus with the video decoding apparatus mounted therein, according to the present embodiment. PROD_C denotes the recording apparatus with the video coding apparatus mounted therein, and PROD_D denotes the reconstruction apparatus with the video decoding apparatus mounted therein.

PROD_C in FIG. 3 is a block diagram illustrating a configuration of a recording apparatus PROD_C with the aforementioned video coding apparatus 11 mounted therein. As illustrated in the drawing, the recording apparatus PROD_C includes a coder PROD_C1 that obtains coded data by coding a video and a writing unit PROD_C2 that writes the coded data obtained by the coder PROD_C1 in a recording medium PROD_M. The aforementioned video coding apparatus 11 is used as the coder PROD_C1.

Note that the recording medium PROD_M may be (1) a type of recording medium built in the recording apparatus PROD_C such as a hard disk drive (HDD) or a solid state drive (SSD), may be (2) a type of recording medium connected to the recording apparatus PROD_C such as an SD memory card or a universal serial bus (USB) flash memory, or may be (3) a type of recording medium loaded in a drive apparatus (not illustrated) built in the recording apparatus PROD_C such as Digital Versatile Disc (DVD: registered trademark) or Blu-ray Disc (BD: registered trademark).

In addition, the recording apparatus PROD_C may further include a camera PROD_C3 that images a video, an input terminal PROD_C4 for inputting the video from the outside, a receiver PROD_C5 for receiving the video, and an image processing unit PROD_C6 that generates or processes images, as supply sources of the video to be input to the coder PROD_C1. Although an exemplary configuration in which the recording apparatus PROD_C includes all of these components is illustrated in the drawing, some of the components may be omitted.

Note that the receiver PROD_C5 may receive a video which has not been coded or may receive coded data coded in a coding scheme for transmission that is different from the coding scheme for recording. In the latter case, a decoder for transmission (not illustrated) that decodes coded data coded in the coding scheme for transmission is preferably interposed between the receiver PROD_C5 and the coder PROD_C1.

Examples of such recording apparatus PROD_C include a DVD recorder, a BD recorder, a hard disk drive (HDD) recorder, and the like (in this case, the input terminal PROD_C4 or the receiver PROD_C5 is the main supply source of videos). In addition, a camcorder (in this case, the camera PROD_C3 is the main supply source of videos), a personal computer (in this case, the receiver PROD_C5 or the image processing unit C6 is the main supply source of videos), a smartphone (in this case, the camera PROD_C3 or the receiver PROD_C5 is the main supply source of videos), or the like is also an example of such an recording apparatus PROD_C.

PROD_D in FIG. 3 is a block illustrating a configuration of a reconstruction apparatus PROD_D with the aforementioned video decoding apparatus 31 mounted therein. As illustrated in the drawing, the reconstruction apparatus PROD_D includes a reader PROD_D1 which reads coded data written in the recording medium PROD_M and a decoder PROD_D2 which obtains a video by decoding the coded data read by the reader PROD_D1. The aforementioned video decoding apparatus 31 is used as the decoder PROD_D2.

Note that the recording medium PROD_M may be (1) a type of recording medium built in the reconstruction apparatus PROD_D such as an HDD or an SSD, may be (2) a type of recording medium connected to the reconstruction apparatus PROD_D such as an SD memory card or a USB flash memory, or may be (3) a type of recording medium loaded in a drive apparatus (not illustrated) built in the reconstruction apparatus PROD_D such as a DVD or a BD.

Also, the reconstruction apparatus PROD_D may further include a display PROD_D3 that displays a video, an output terminal PROD_D4 for outputting the video to the outside, and a transmitter PROD_D5 that transmits the video, as the supply destinations of the video to be output by the decoder PROD_D2. Although an exemplary configuration in which the reconstruction apparatus PROD_D includes all of these components is illustrated in the drawing, some of the components may be omitted.

Note that the transmitter PROD_D5 may transmit a video which has not been coded or may transmit coded data coded in the coding scheme for transmission that is different from a coding scheme for recording. In the latter case, a coder (not illustrated) that codes a video in the coding scheme for transmission is preferably interposed between the decoder PROD_D2 and the transmitter PROD_D5.

Examples of such a reconstruction apparatus PROD_D include a DVD player, a BD player, an HDD player, and the like (in this case, the output terminal PROD_D4 to which a television receiver and the like are connected is the main supply destination of videos). In addition, a television receiver (in this case, the display PROD_D3 is the main supply destination of videos), a digital signage (also referred to as an electronic signboard, an electronic bulletin board, or the like, and the display PROD_D3 or the transmitter PROD_D5 is the main supply destination of videos), a desktop PC (in this case, the output terminal PROD_D4 or the transmitter PROD_D5 is the main supply destination of videos), a laptop or tablet PC (in this case, the display PROD_D3 or the transmitter PROD_D5 is the main supply destination of videos), a smartphone (in this case, the display PROD_D3 or the transmitter PROD_D5 is the main supply destination of videos), or the like is an example of the reconstruction apparatus PROD_D.

Realization as Hardware and Realization as Software

Also, each block of the aforementioned video decoding apparatus 31 and the video coding apparatus 11 may be realized as hardware by a logical circuit formed on an integrated circuit (IC chip) or may be realized as software using a central processing unit (CPU).

In the latter case, each of the aforementioned apparatuses includes a CPU that executes a command of a program to implement each function, a read only memory (ROM) that stores the aforementioned program, a random access memory (RAM) to which the aforementioned program is loaded, and a storage device (recording medium), such as a memory, that stores the aforementioned program and various kinds of data. In addition, an objective of the embodiments of the disclosure can be achieved by supplying, to each of the apparatuses, the recording medium that records, in a computer readable form, program codes of a control program (an executable program, an intermediate code program, a source program) of each of the aforementioned apparatuses that is software for realizing the aforementioned functions and by reading and executing, by the computer (or a CPU or a MPU), the program codes recorded in the recording medium.

Examples of the recording medium that can be used include tapes including a magnetic tape, a cassette tape, and the like, discs including magnetic disks such as a floppy (trade name) disk/a hard disk and optical discs such as a compact disc read-only memory (CD-ROM)/a magneto-optical disc (MO disc)/a mini disc (MD)/a Digital Versatile Disc (DVD: registered trademark)/a CD Recordable (CD-R)/a Blu-ray Disc (registered trademark), cards such as an IC card (including a memory card)/an optical card, semiconductor memories such as a mask ROM/an erasable programmable read-only memory (EPROM)/an Electrically Erasable and Programmable Read-Only Memory (EEPROM: registered trademark)/a flash ROM, logical circuits such as a programmable logic device (PLD) and a field programmable gate array (FPGA), or the like.

In addition, each of the aforementioned apparatuses may be configured to be connectable to a communication network, and the program codes may be supplied through the communication network. The communication network is not particularly limited as long as the communication network can transmit the program codes. For example, the Internet, an intranet, an extranet, a local area network (LAN), an integrated services digital network (ISDN), a value-added network (VAN), a community antenna television/cable television (CATV) communication network, a virtual private network, a telephone network, a mobile communication network, a satellite communication network, and the like are available. In addition, a transmission medium configuring this communication network is also not limited to a specific configuration or a type as long as the transmission medium can transmit the program codes. For example, wired transmission media such as Institute of Electrical and Electronic Engineers (IEEE) 1394, a USB, a power line carrier, a cable TV line, a telephone line, and an asymmetric digital subscriber line (ADSL) line and wireless transmission media such as infrared rays of infrared data association (IrDA) or a remote control, BlueTooth (registered trademark), IEEE 802.11 wireless communication, a high data rate (HDR), a near-field communication (NFC), a Digital Living Network Alliance (DLNA: registered trademark), a cellular telephone network, a satellite channel, and a terrestrial digital broadcast network are also available. Note that the embodiments of the disclosure can be also realized in the form of computer data signals embedded in a carrier wave, in which the aforementioned program codes are implemented through electronic transmission.

The embodiments of the disclosure are not limited to the aforementioned embodiments, and various modifications can be made within the scope of the claims. In other words, embodiments obtained as combinations of technical means with appropriate modifications within the scope of the claims are also included within the technical scope of the disclosure.

INDUSTRIAL APPLICABILITY

The embodiments of the disclosure can be suitably applied to a video decoding apparatus that decodes coded data in which image data is coded and a video coding apparatus that generates coded data in which image data is coded. Also, the embodiments of the disclosure can be suitably applied to a data structure of coded data generated by the video coding apparatus and referred to by the video decoding apparatus.

While preferred embodiments of the present invention have been described above, it is to be understood that variations and modifications will be apparent to those skilled in the art without departing from the scope and spirit of the present invention. The scope of the present invention, therefore, is to be determined solely by the following claims.

The invention claimed is:

1. A video decoding apparatus comprising:
a merge candidate derivation circuit for deriving a merge candidate with reference to a collocated position, spatially located at a bottom right or a center relative to a target block, in a collocated picture, deriving a pair-wise candidate from an average of two merge candidates stored in a merge candidate list, and storing the pair-wise candidate in the merge candidate list; and
a parameter decoding circuit for receiving a picture header, a slice header, and a picture parameter set, and, in a case that an sps_temporal_mvp_enabled_flag included in a sequence parameter set indicates that a temporal motion vector prediction is used, decoding a pic_temporal_mvp_enabled_flag from the picture header, wherein the pic_temporal_mvp_enabled_flag indicates whether the temporal motion vector prediction is used for decoding a slice associated with the picture header, and wherein, in a case that the pic_temporal_mvp_enabled_flag is true, the parameter decoding circuit decodes:
(i) a collocated_from_l0_flag, wherein a value of the collocated_from_l0_flag being equal to 1 indicates that a collocated picture used for the temporal motion vector prediction is derived from a reference picture list 0, and the value of the collocated_from_l0_flag being equal to 0 indicates that the collocated picture used for the temporal motion vector prediction is derived from a reference picture list 1, and
(ii) only one collocated_ref_idx from the picture header, wherein the only one collocated_ref_idx is a reference index of the collocated picture used for the temporal motion vector prediction, wherein, in a case that a slice type is B and the value of the collocated_from_l0_flag is 1, a picture in the reference picture list 0 is to be referred to for the only one collocated_ref_idx, and wherein, in a case that the slice type is B and the value of the collocated_from_l0_flag is 0, a picture in the reference picture list 1 is to be referred to for the only one collocated_ref_idx.

* * * * *